US011775814B1

(12) United States Patent
Anand et al.

(10) Patent No.: US 11,775,814 B1
(45) Date of Patent: *Oct. 3, 2023

(54) AUTOMATED DETECTION OF CONTROLS IN COMPUTER APPLICATIONS WITH REGION BASED DETECTORS

(71) Applicant: Automation Anywhere, Inc., San Jose, CA (US)

(72) Inventors: Virinchipuram J Anand, San Ramon, CA (US); Nakuldev Patel, Vadodara (IN); Sheel Shah, Vadodara (IN); Sachi Shah, Vadodara (IN); Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 823 days.

This patent is subject to a terminal disclaimer.

(21) Appl. No.: 16/527,048

(22) Filed: Jul. 31, 2019

(51) Int. Cl.
*G06V 10/75* (2022.01)
*G06N 3/08* (2023.01)
(Continued)

(52) U.S. Cl.
CPC ............... *G06N 3/08* (2013.01); *G06F 16/53* (2019.01); *G06F 18/211* (2023.01); *G06F 18/213* (2023.01); *G06F 18/24* (2023.01); *G06F 18/25* (2023.01); *G06T 7/60* (2013.01); *G06V 10/759* (2022.01); *G06V 30/18* (2022.01);
(Continued)

(58) Field of Classification Search
CPC ........ G06N 3/08; G06F 16/53; G06K 9/6228; G06K 9/6267; G06K 9/6288; G06K 9/6232; G06T 7/60; G06T 2207/20081; G06T 2207/20084; G06V 10/20; G06V 10/40

See application file for complete search history.

(56) References Cited

U.S. PATENT DOCUMENTS 5,949,999 A  9/1999 Song et al.
5,983,001 A  11/1999 Boughner et al.
(Continued)

FOREIGN PATENT DOCUMENTS

WO  2019/092672 A2  5/2019
WO  2022/076488     4/2022

OTHER PUBLICATIONS

Dai, Jifeng, et al. "R-fcn: Object detection via region-based fully convolutional networks." Advances in neural information processing systems 29 (2016). (Year: 2016).*
(Continued)

*Primary Examiner* — Amandeep Saini
*Assistant Examiner* — Denise G Alfonso

(57) ABSTRACT

Controls within images of a user interface of a computer application are detected by way of region-based R-FCN and Faster R-CNN engines. Datasets comprising images containing application control, wherein the application controls include images of application where width is greater than height, width is equal to height and height is greater than width are retrieved. Each of the datasets is processed with the R-FCN and Faster R-CNN engines to generate a software configured to recognize, from an input image, application controls wherein the application controls are characterized by dimensions where width is greater than height, where width is substantially equal to height, and where height is greater than width.

16 Claims, 15 Drawing Sheets

(51) Int. Cl.
  *G06T 7/60* (2017.01)
  *G06F 16/53* (2019.01)
  *G06F 18/24* (2023.01)
  *G06F 18/25* (2023.01)
  *G06F 18/211* (2023.01)
  *G06F 18/213* (2023.01)
  *G06V 30/18* (2022.01)

(52) U.S. Cl.
  CPC .............. *G06T 2207/20081* (2013.01); *G06T 2207/20084* (2013.01)

(56) References Cited

U.S. PATENT DOCUMENTS

| | | |
|---|---|---|
| 6,009,192 A | 12/1999 | Klassen et al. |
| 6,133,917 A | 10/2000 | Feigner et al. |
| 6,226,407 B1 | 5/2001 | Zabih et al. |
| 6,389,592 B1 | 5/2002 | Ayres et al. |
| 6,397,215 B1 | 5/2002 | Kreulen et al. |
| 6,427,234 B1 | 7/2002 | Chambers et al. |
| 6,473,794 B1 | 10/2002 | Guheen et al. |
| 6,496,979 B1 | 12/2002 | Chen et al. |
| 6,640,244 B1 | 10/2003 | Bowman-Amuah |
| 6,704,873 B1 | 3/2004 | Underwood |
| 6,898,764 B2 | 5/2005 | Kemp |
| 6,954,747 B1 | 10/2005 | Wang et al. |
| 6,957,186 B1 | 10/2005 | Guheen et al. |
| 7,091,898 B2 | 8/2006 | Arling et al. |
| 7,246,128 B2 | 7/2007 | Jordahl |
| 7,398,469 B2 | 7/2008 | Kisamore et al. |
| 7,441,007 B1 | 10/2008 | Kirkpatrick et al. |
| 7,533,096 B2 | 5/2009 | Rice et al. |
| 7,568,109 B2 | 7/2009 | Powell et al. |
| 7,571,427 B2 | 8/2009 | Wang et al. |
| 7,765,525 B1 | 7/2010 | Davidson et al. |
| 7,805,317 B2 | 9/2010 | Khan et al. |
| 7,805,710 B2 | 9/2010 | North |
| 7,810,070 B2 | 10/2010 | Nasuti et al. |
| 7,846,023 B2 | 12/2010 | Evans et al. |
| 8,028,269 B2 | 9/2011 | Bhatia et al. |
| 8,056,092 B2 | 11/2011 | Allen et al. |
| 8,095,910 B2 | 1/2012 | Nathan et al. |
| 8,132,156 B2 | 3/2012 | Malcolm |
| 8,209,738 B2 | 6/2012 | Nicol et al. |
| 8,234,622 B2 | 7/2012 | Meijer et al. |
| 8,245,215 B2 | 8/2012 | Extra |
| 8,352,464 B2 | 1/2013 | Fotev |
| 8,365,147 B2 | 1/2013 | Grechanik |
| 8,396,890 B2 | 3/2013 | Lim |
| 8,438,558 B1 | 5/2013 | Adams |
| 8,443,291 B2 | 5/2013 | Ku et al. |
| 8,464,240 B2 | 6/2013 | Fritsch et al. |
| 8,498,473 B2 | 7/2013 | Chong et al. |
| 8,504,803 B2 | 8/2013 | Shukla |
| 8,631,458 B1 | 1/2014 | Banerjee |
| 8,682,083 B2 | 3/2014 | Kumar et al. |
| 8,713,003 B2 | 4/2014 | Fotev |
| 8,724,907 B1 | 5/2014 | Sampson et al. |
| 8,769,482 B2 | 7/2014 | Batey et al. |
| 8,819,241 B1 | 8/2014 | Washburn |
| 8,832,048 B2 | 9/2014 | Lim |
| 8,874,685 B1 | 10/2014 | Hollis et al. |
| 8,943,493 B2 | 1/2015 | Schneider |
| 8,965,905 B2 | 2/2015 | Ashmore et al. |
| 9,032,314 B2 | 5/2015 | Mital et al. |
| 9,104,294 B2 | 8/2015 | Forstall et al. |
| 9,171,359 B1 | 10/2015 | Lund |
| 9,213,625 B1 | 12/2015 | Schrage |
| 9,278,284 B2 | 3/2016 | Ruppert et al. |
| 9,444,844 B2 | 9/2016 | Edery et al. |
| 9,462,042 B2 | 10/2016 | Shukla et al. |
| 9,571,332 B2 | 2/2017 | Subramaniam et al. |
| 9,600,519 B2 | 3/2017 | Schoning et al. |
| 9,621,584 B1 | 4/2017 | Schmidt et al. |
| 9,946,233 B2 | 4/2018 | Brun et al. |
| 9,965,139 B2 | 5/2018 | Nychis |
| 9,990,347 B2 | 6/2018 | Raskovic et al. |
| 10,015,503 B1 | 7/2018 | Ahammad |
| 10,025,773 B2 | 7/2018 | Bordawekar et al. |
| 10,043,255 B1 | 8/2018 | Pathapati et al. |
| 10,078,743 B1 | 9/2018 | Baldi et al. |
| 10,282,280 B1 | 5/2019 | Gouskova |
| 10,489,682 B1 | 11/2019 | Kumar et al. |
| 10,654,166 B1 | 5/2020 | Hall |
| 10,706,218 B2 | 7/2020 | Milward et al. |
| 11,176,443 B1 * | 11/2021 | Selva .................. G06K 9/6267 |
| 11,182,178 B1 | 11/2021 | Singh et al. |
| 11,243,803 B2 | 2/2022 | Anand et al. |
| 11,348,353 B2 | 5/2022 | Sundell et al. |
| 11,614,731 B2 | 3/2023 | Anand et al. |
| 2002/0029232 A1 | 3/2002 | Bobrow et al. |
| 2003/0033590 A1 | 2/2003 | Leherbauer |
| 2003/0101245 A1 | 5/2003 | Srinivasan et al. |
| 2003/0114959 A1 | 6/2003 | Sakamoto |
| 2003/0159089 A1 | 8/2003 | DiJoseph |
| 2004/0083472 A1 | 4/2004 | Rao et al. |
| 2004/0153649 A1 | 8/2004 | Rhoads |
| 2004/0172526 A1 | 9/2004 | Tann et al. |
| 2004/0210885 A1 | 10/2004 | Wang et al. |
| 2004/0243994 A1 | 12/2004 | Nasu |
| 2005/0002566 A1 | 1/2005 | Federico et al. |
| 2005/0144462 A1 | 6/2005 | LaGarde |
| 2005/0188357 A1 | 8/2005 | Derks et al. |
| 2005/0204343 A1 | 9/2005 | Kisamore et al. |
| 2005/0257214 A1 | 11/2005 | Moshir et al. |
| 2006/0095276 A1 | 5/2006 | Axelrod et al. |
| 2006/0150188 A1 | 7/2006 | Roman et al. |
| 2006/0218110 A1 | 9/2006 | Simske et al. |
| 2007/0030528 A1 | 2/2007 | Quaeler et al. |
| 2007/0101291 A1 | 5/2007 | Forstall et al. |
| 2007/0112574 A1 | 5/2007 | Greene |
| 2007/0156677 A1 | 7/2007 | Szabo |
| 2008/0005086 A1 | 1/2008 | Moore |
| 2008/0027769 A1 | 1/2008 | Eder |
| 2008/0028392 A1 | 1/2008 | Chen et al. |
| 2008/0133052 A1 | 6/2008 | Jones |
| 2008/0209392 A1 | 8/2008 | Able et al. |
| 2008/0222454 A1 | 9/2008 | Kelso |
| 2008/0263024 A1 | 10/2008 | Landschaft et al. |
| 2009/0037509 A1 | 2/2009 | Parekh et al. |
| 2009/0103769 A1 | 4/2009 | Milov et al. |
| 2009/0116071 A1 | 5/2009 | Mantell |
| 2009/0172814 A1 | 7/2009 | Khosravi et al. |
| 2009/0199160 A1 | 8/2009 | Vaitheeswaran et al. |
| 2009/0217309 A1 | 8/2009 | Grechanik et al. |
| 2009/0249297 A1 | 10/2009 | Doshi et al. |
| 2009/0313229 A1 | 12/2009 | Fellenstein et al. |
| 2009/0320002 A1 | 12/2009 | Peri-Glass et al. |
| 2010/0013848 A1 | 1/2010 | Hekstra et al. |
| 2010/0023602 A1 | 1/2010 | Martone |
| 2010/0023933 A1 | 1/2010 | Bryant et al. |
| 2010/0100605 A1 | 4/2010 | Allen et al. |
| 2010/0106671 A1 | 4/2010 | Li et al. |
| 2010/0138015 A1 | 6/2010 | Colombo et al. |
| 2010/0235433 A1 | 9/2010 | Ansari et al. |
| 2010/0251163 A1 | 9/2010 | Keable |
| 2011/0022578 A1 | 1/2011 | Fotev |
| 2011/0106284 A1 | 5/2011 | Catoen |
| 2011/0145807 A1 | 6/2011 | Molinie et al. |
| 2011/0197121 A1 | 8/2011 | Kletter |
| 2011/0276568 A1 | 11/2011 | Fotev |
| 2011/0276946 A1 | 11/2011 | Pletter |
| 2011/0302570 A1 | 12/2011 | Kurimilla et al. |
| 2012/0011458 A1 | 1/2012 | Xia et al. |
| 2012/0042281 A1 | 2/2012 | Green |
| 2012/0076415 A1 | 3/2012 | Kahn |
| 2012/0124062 A1 | 5/2012 | Macbeth et al. |
| 2012/0131456 A1 | 5/2012 | Lin et al. |
| 2012/0143941 A1 | 6/2012 | Kim |
| 2012/0154633 A1 | 6/2012 | Rodriguez |
| 2012/0324333 A1 | 12/2012 | Lehavi |
| 2012/0330940 A1 | 12/2012 | Caire et al. |
| 2013/0173648 A1 | 7/2013 | Tan et al. |
| 2013/0236111 A1 | 9/2013 | Pintsov |

(56) References Cited

U.S. PATENT DOCUMENTS

| | | |
|---|---|---|
| 2013/0290318 A1 | 10/2013 | Shapira et al. |
| 2014/0036290 A1 | 2/2014 | Miyagawa |
| 2014/0045484 A1 | 2/2014 | Kim et al. |
| 2014/0181705 A1 | 6/2014 | Hey et al. |
| 2014/0189576 A1 | 7/2014 | Cami |
| 2015/0082280 A1 | 3/2015 | Betak et al. |
| 2015/0310268 A1 | 10/2015 | He |
| 2015/0347284 A1 | 12/2015 | Hey et al. |
| 2016/0019049 A1 | 1/2016 | Kakhandiki et al. |
| 2016/0034441 A1 | 2/2016 | Nguyen et al. |
| 2016/0078368 A1 | 3/2016 | Kakhandiki et al. |
| 2016/0119285 A1 | 4/2016 | Kakhandiki et al. |
| 2017/0060108 A1 | 3/2017 | Kakhandiki et al. |
| 2017/0154230 A1 | 6/2017 | Dow et al. |
| 2017/0213130 A1 | 7/2017 | Khatri et al. |
| 2017/0270431 A1 | 9/2017 | Hosabettu |
| 2017/0330076 A1 | 11/2017 | Valpola |
| 2018/0004823 A1 | 1/2018 | Kakhandiki et al. |
| 2018/0113781 A1 | 4/2018 | Kim |
| 2018/0157386 A1 | 6/2018 | Su |
| 2018/0173698 A1 | 6/2018 | Dubey et al. |
| 2018/0218429 A1 | 8/2018 | Guo et al. |
| 2018/0275835 A1 | 9/2018 | Prag |
| 2019/0005050 A1 | 1/2019 | Proux |
| 2019/0028587 A1 | 1/2019 | Unitt |
| 2019/0126463 A1 | 5/2019 | Purushothaman |
| 2019/0141596 A1 | 5/2019 | Gay |
| 2019/0188462 A1 | 6/2019 | Nishida |
| 2019/0213822 A1 | 7/2019 | Jain |
| 2019/0266692 A1 | 8/2019 | Stach et al. |
| 2019/0317803 A1 | 10/2019 | Maheshwari |
| 2019/0324781 A1* | 10/2019 | Ramamurthy ....... G06N 3/0454 |
| 2019/0340240 A1 | 11/2019 | Duta |
| 2019/0377987 A1 | 12/2019 | Price et al. |
| 2020/0019767 A1 | 1/2020 | Porter et al. |
| 2020/0034976 A1 | 1/2020 | Stone et al. |
| 2020/0097742 A1 | 3/2020 | Kumar et al. |
| 2020/0151591 A1 | 5/2020 | Li |
| 2020/0249964 A1 | 8/2020 | Fernandes |
| 2022/0245936 A1* | 8/2022 | Valk ..................... G06V 10/242 |
| 2022/0405094 A1 | 12/2022 | Farquhar |

OTHER PUBLICATIONS

Ren, Shaoqing, et al. "Faster r-cnn: Towards real-time object detection with region proposal networks." Advances in neural information processing systems 28 (2015). (Year: 2015).*
Chollet, Francois et al., Keras: The Python Deep Learning Library, GitHub, https://github/keras-team/keras, 2015.
Al Sallami, Load Balancing in Green Cloud Computation, Proceedings of the World Congress on Engineering 2013 vol. II, WCE 2013, 2013, pp. 1-5 (Year: 2013).
B.P. Kasper "Remote: a Means of Remotely Controlling and Storing Data from a HAL Quadrupole Gass Analyzer Using an IBM-PC Compatible Computer", Nov. 15, 1995, Space and Environment Technology Center.
Bergen et al., RPC automation: making legacy code releant, May 2013, 6 pages.
Hu et al., Automating GUI testing for Android applications, May 2011, 7 pages.
Konstantinou et al., An architecture for virtual solution composition and deployment in infrastructure clouds, 9 pages (Year: 2009).
Nyulas et al., An Ontology-Driven Framework for Deploying JADE Agent Systems, 5 pages (Year: 2006).
Tom Yeh, Tsung-Hsiang Chang, and Robert C. Miller, Sikuli: Using GUI Screenshots for Search and Automation, Oct. 4-7, 2009, 10 pages.
Yu et al., Deplying and managing Web services: issues, solutions, and directions, 36 pages (Year: 2008).
Zhifang et al., Test automation on mobile device, May 2010, 7 pages.
Non-Final Office Action for U.S. Appl. No. 17/230,492, dated Oct. 14, 2022.
Notice of Allowance for U.S. Appl. No. 16/398,532, dated Oct. 23, 2022.
Non-Final Office Action for U.S. Appl. No. 16/876,530, dated Sep. 29, 2020.
Final Office Action for U.S. Appl. No. 16/876,530, dated Apr. 13, 2021.
Notice of Allowance for U.S. Appl. No. 16/876,530, dated Jul. 22, 2021.
Dai, Jifeng et al., "R-fcn: Object detectiom via region-based fully convolutional networks", Advances in neural information processing systems 29 (2016). (Year: 2016).
Ren, Shaoqing et al., "Faster r-cnn: Towards real0time object detection with region proposal network." Advances in neutral information processing systems 28 (2015). (Year: 2015).
Zhifang et al., Test automation on mobile device, May 2010, 7 pages.
International Search Report for PCT/US2021/053669, dated May 11, 2022.
Embley et al., "Table-processing paradigms: a research survey", International Journal on Document Analysis and Recognition, vol. 8, No. 2-3, May 9, 2006, pp. 66-86.
Non-Final Office Action for U.S. Appl. No. 16/925,956, dated Sep. 16, 2021.
Notice of Allowance for U.S. Appl. No. 16/925,956, dated Jan. 7, 2022.
Pre-Interview Office Action for U.S. Appl. No. 16/398,532, dated Jul. 8, 2022.
Notice of Allowance for U.S. Appl. No. 16/398,532, dated Jul. 8, 2022.
Non-Final Office Action for U.S. Appl. No. 17/139,838, dated Feb. 22, 2022.
Final Office Action for U.S. Appl. No. 17/139,838, dated Nov. 15, 2023.
Notice of Allowance for U.S. Appl. No. 17/139,838, dated Apr. 5, 2023.
International Search Report and Written Opinion for PCT/US2021/015691, dated May 11, 2021.
A density-based algorithm for discovering clusters in large spatial databases with noise, Ester, Martin; Kriegel, Hans-Peter; Sander, Jorg; Xu, Xiaowei, Simoudis, Evangelos; Han, Jiawei; Fayyad, Usama M., eds., Proceedings of the Second International Conference on Knowledge Discovery and Data Mining (KDD-96). AMI Press. pp. 226-231 (1996).
Deep Residual Learning for Image Recognition, by K. He, X. Zhang, S. Ren, and J. Sun, arXiv:1512.03385 (2015).
FaceNet: A Unified Embedding for Face Recognition and Clustering, by F. Schroff, D. Kalenichenko, J. Philbin, arXiv:1503.03832 (2015).
Muhammad et al. "Fuzzy multilevel graph embedding", copyright 2012 Elsevier Ltd.
Sharma et al. Determining similarity in histological images using graph-theoretic description and matching methods for content-based image retrieval in medical diagnostics, Biomed Center, copyright 2012.
First Action Interview Pilot Program Pre-Interview communication for U.S. Appl. No. 16/779,462, dated Dec. 3, 2021.
Reply under 37 CDT 1.111 to Pre-Interview Communication for U.S. Appl. No. 16/779,462, filed Jan. 25, 2022.
Notice of Allowance for U.S. Appl. No. 16/779,462 dated Feb. 9, 2022.
Notice of Allowance for U.S. Appl. No. 17/131,674, dated Jun. 22, 2023.
Non-Final Office Action for U.S. Appl. No. 16/731,044, dated Jan. 25, 2021.
Notice of Allowance for U.S. Appl. No. 16/731,044, dated May 5, 2021.
Alex Krizhevsky, Ilya Sutskever, and Geoffrey E Hinton, Imagenet classification with deep convolutional neural networks, Advances in neural information processing systems (2012).
Andrew G Howard, Menglong Zhu, Bo Chen, Dmitry Kalenichenko, Weijun Wang, Tobias Weyand, Marco Andreetto, and Hartwig Adam, Mobilenets: Efficient convolutional neural networks for mobile vision applications, arXiv:1704.04861v1 (2017).

(56) References Cited

OTHER PUBLICATIONS

Christian Szegedy, Wei Liu, Yangqing Jia, Pierre Sermanet, Scott Reed, Dragomir Anguelov, Dumitru Erhan, Vincent Vanhoucke, and Andrew Rabinovich, Going deeper with convolutions, Proceedings of the IEEE conference on computer vision and pattern recognition, pp. 1-9 (2015).

J. Canny, A computational approach to edge detection, IEEE Transactions on Pattern Analysis and Machine Intelligence, PAMI-8(6):679- 698, Nov. 1986.

Jasper RR Uijlings, Koen EA Van De Sande, Theo Gevers, and Arnold WM Smeulders, Selective search for object recognition, International journal of computer vision, 104(2) (2013).

Jifeng Dai, Yi Li, Kaiming He, and Jian Sun, R-fcn: Object detection via region-based fully convolutional networks, Advances in neural information processing systems, 2016.

Joseph Redmon, Santosh Divvala, Ross Girshick, and Ali Farhadi, You only look once: Unified, real-time object detection, Proceedings of the IEEE conference on computer vision and pattern recognition, pp. 779-788, 2016.

Kaiming He, Xiangyu Zhang, Shaoqing Ren, and Jian Sun, Deep residual learning for image recognition, Proceedings of the IEEE conference on computer vision and pattern recognition (2016).

M. A. Hearst, S. T. Dumais, E. Osuna, J. Platt, and B. Scholkopf, Support vector machines, IEEE Intelligent Systems and their Applications, 13(4):18-28, Jul. 1998.

Navneet Dalal and Bill Triggs, Histograms of oriented gradients for human detection, International Conference on computer vision & Pattern Recognition (CVPR'05), vol. 1, pp. 886-893. IEEE Computer Society, 2005.

Ross Girshick, Fast r-cnn, Proceedings of the IEEE international conference on computer vision (2015).

Ross Girshick, Jeff Donahue, Trevor Darrell, and Jitendra Malik, Rich feature hierarchies for accurate object detection and semantic segmentation, Proceedings of the IEEE conference on computer vision and pattern recognition (2014).

Shaoqing Ren, Kaiming He, Ross Girshick, and Jian Sun, Faster r-cnn: Towards real-time object detection with region proposal networks, Advances in neural information processing systems, 2015.

Tsung-Yi Lin, Michael Maire, Serge Belongie, James Hays, Pietro Perona, Deva Ramanan, Piotr Dollár, and C Lawrence Zitnick, Microsoft coco: Common objects in context, European conference on computer vision (2014).

Tsung-Yi Lin, Priya Goyal, Ross Girshick, Kairning He, and Piotr Dollár, Focal loss for dense object detection, Proceedings of the IEEE international conference on computer vision (2017).

Wei Liu, Dragomir Anguelov, Durnitru Erhan, Christian Szegedy, Scott Reed, Cheng-Yang Fu, and Alexander C Berg, Ssd: Single shot multibox detector, European conference on computer vision, pp. 21-37. Springer, 2016.

\* cited by examiner

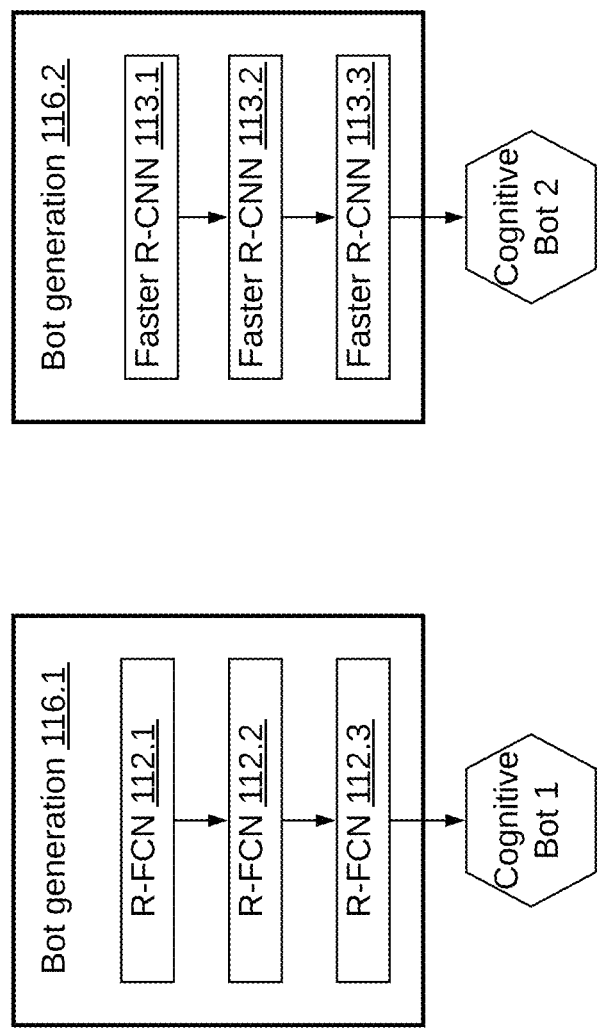

US 11,775,814 B1

AUTOMATED DETECTION OF CONTROLS IN COMPUTER APPLICATIONS WITH REGION BASED DETECTORS

FIELD OF THE DISCLOSURE

This disclosure relates generally to the field of data processing systems and more particularly to computerized image recognition.

BACKGROUND

Accurate identification and extraction of data from business documents is an important aspect of computerized processing of business documents. In particular, as the demand for automation increases, it is imperative to recognize controls in legacy application programs which do not provide programmatic access in order to automate usage of such applications. For websites, the code is available in one form or another so detection of controls and their type on the website is relatively straightforward. However, many licensed applications do not allow permit access to their code. Automated detection of controls on such applications for automation is a challenge. Detection of such controls could reduce monotonous tasks such as data entry and form filling, thereby potentially saving thousands of man-hours and leading to better accuracy.

Many attempts have been made previously to solve this problem using computer vision and general edge detection techniques. However, these techniques are not generalized and heavily rely on the completeness of edges. Hence, controls with broken edges cannot be detected by this approach. Moreover, visually appealing controls on modern webpages such as a textbox with just an underline are not detected by these techniques.

SUMMARY

While there have been significant advancements in object detection with state-of-the-art networks performing well on various domains, use of such networks for control detection on computer application screens is a novel approach. Disclosed herein is a computerized method, system and computer program product for automated detection of application level controls displayed by a computer application. A first dataset comprising images containing a first type of application control is retrieved, wherein each application control of the first type of application control is characterized by dimensions where width is greater than height. A second dataset comprising images containing a second type of application control is retrieved, wherein each application control of the second type of application control is characterized by dimensions where width is substantially equal to height. A third dataset comprising images containing a third type of application control is retrieved, wherein each application control of the third type of application control is characterized by dimensions where height is greater than width. The first, second and third datasets are each processed with a region-based R-FCN engine to generate a first trained region-based R-FCN engine that is trained to recognize application controls characterized by dimensions where width is greater than height, a second trained region-based R-FCN engine that is trained to recognize application controls characterized by dimensions where width is substantially equal to height, and a third trained region-based R-FCN engine that is trained to recognize application controls characterized by dimensions where height is greater than width. The first, second and third trained region-based R-FCN engines are combined to generate a software robot configured to recognize, from an input image, application controls wherein the application controls are characterized by dimensions where width is greater than height, where width is substantially equal to height, and where height is greater than width.

In other embodiments, the region-based R-FCN engines may be replaced with or be supplemented by faster R-CNN engines.

These and additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIGS. 5A, 5B, 5C and 5D are block diagrams illustrating operation of two alternative embodiments of bot generation employed by the system of FIG. 1.

DETAILED DESCRIPTION

Figure 1:
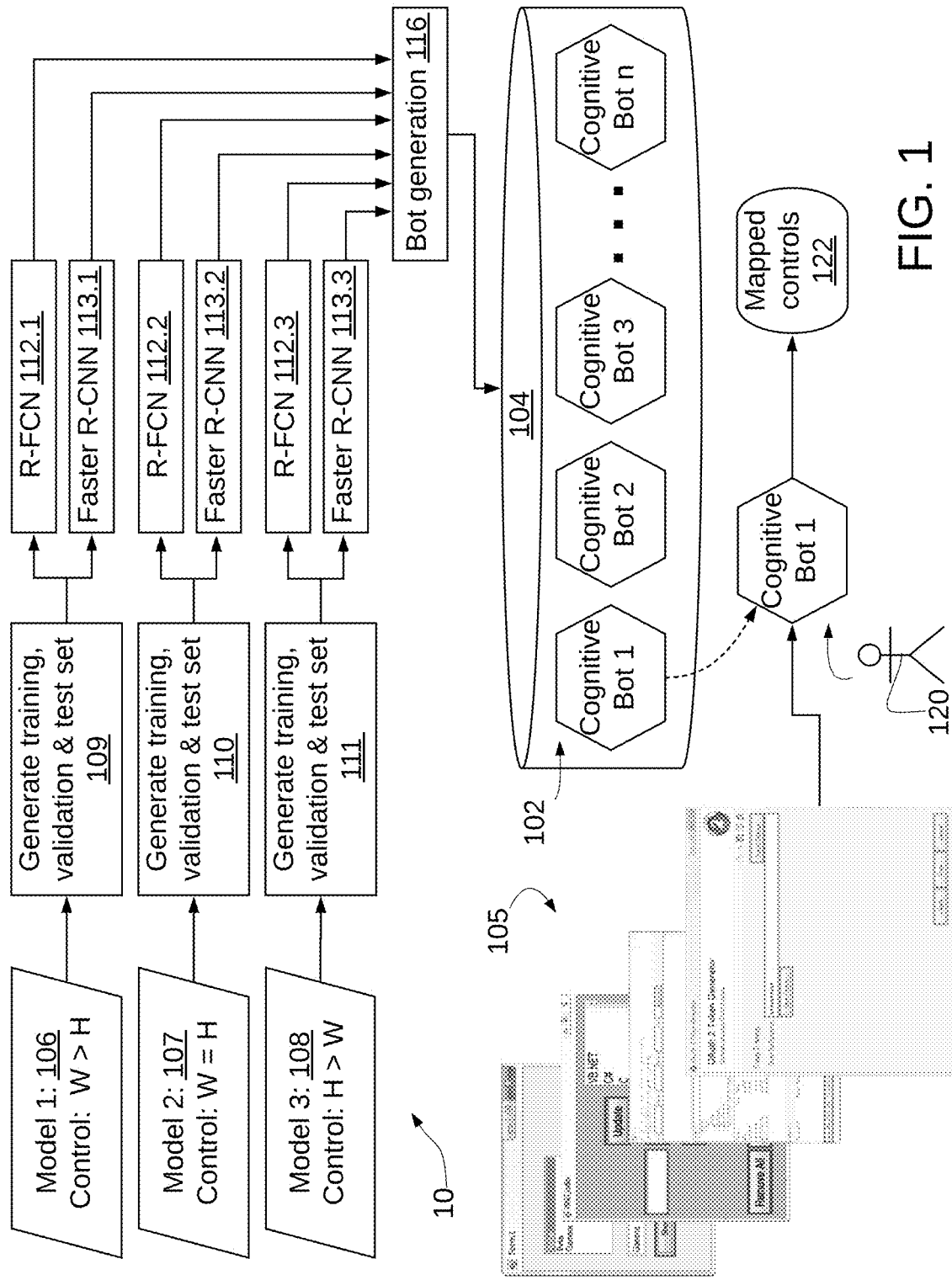
FIG. 1 is high-level block diagram of a computerized system that automatically detects controls in application user interfaces.
Figure 2B:
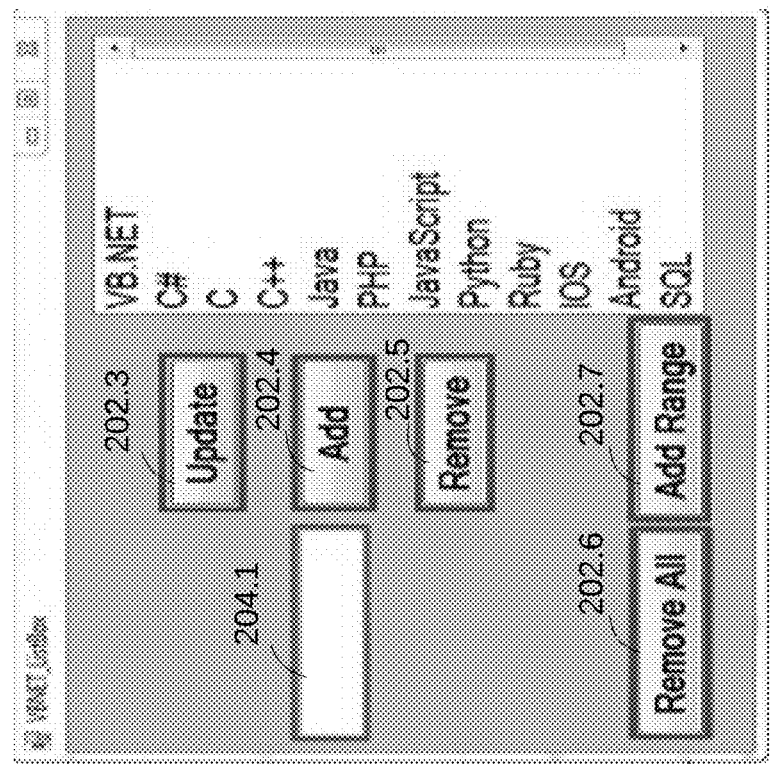
FIGS. 2A, 2B, 2C and 2D are images of various controls employed by various sample application program user interfaces.
Figure 2A:
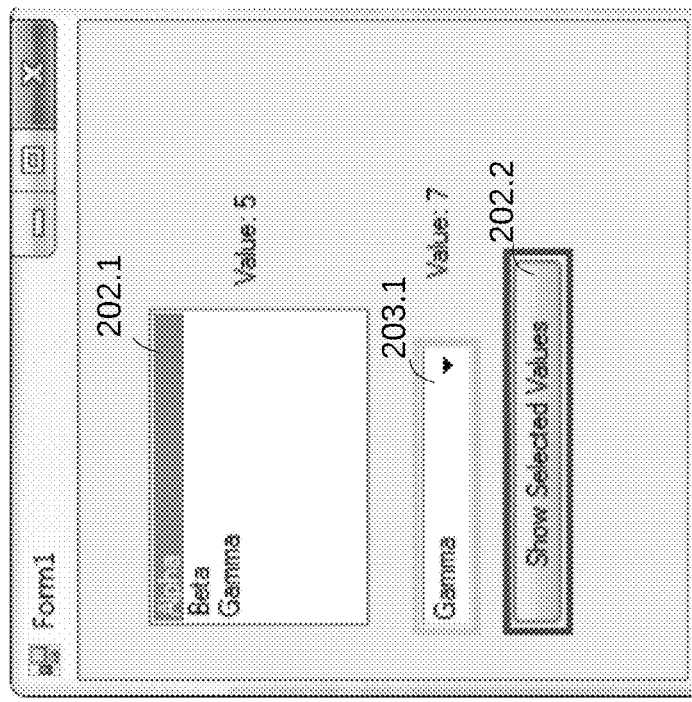
Figure 2C:
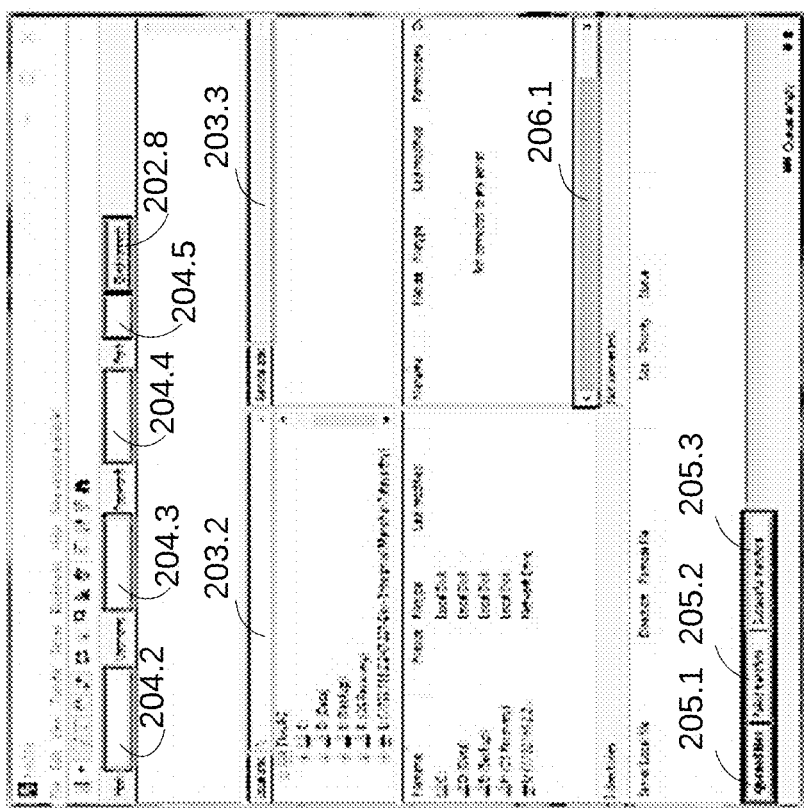
Figure 2D:
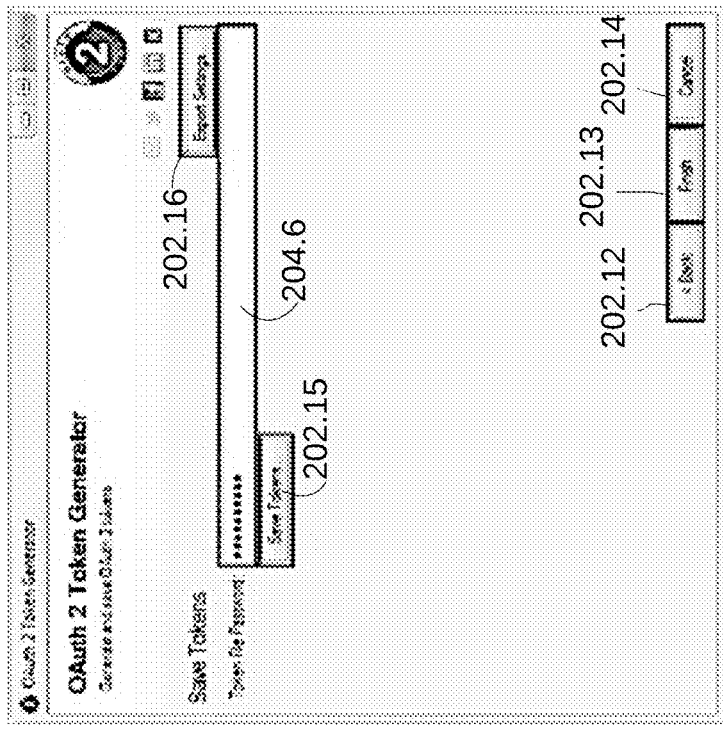

In the following detailed description, reference will be made to the accompanying drawings, in which identical functional elements are designated with like numerals. Elements designated with reference numbers ending in a suffix such as .1, .2, .3 are referred to collectively by employing the main reference number without the suffix. For example, 100 refers to topics 100.1, 100.2, 100.3 generally and collectively. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Explained below in connection with the disclosed embodiments is an overview of various approaches that have been employed in object detection. Preferred embodiments for detecting controls on a computer screen using state-of-the-art object detection models are then described. The disclosed object detection-based approach is also able to detect controls without definite boundaries like trees, which was not possible using any of the previous approaches.

In the following description, to improve readability, reference is made to the following publications by the accompanying reference numbers below:

[1] Wei Liu, Dragomir Anguelov, Dumitru Erhan, Christian Szegedy, Scott Reed, Cheng-Yang Fu, and Alexander C Berg, Ssd: *Single shot multibox detector*, European conference on computer vision, pages 21-37. Springer, 2016.

[2] Shaoqing Ren, Kaiming He, Ross Girshick, and Jian Sun, *Faster r-cnn: Towards real-time object detection with region proposal networks*, Advances in neural information processing systems, pages 91-99, 2015.

[3] Jifeng Dai, Yi Li, Kaiming He, and Jian Sun, *R-fcn: Object detection via region-based fully convolutional networks*, Advances in neural information processing systems, pages 379-387, 2016.

[4] Navneet Dalal and Bill Triggs, *Histograms of oriented gradients for human detection*, International Conference on computer vision & Pattern Recognition (CVPR'05), volume 1, pages 886-893. IEEE Computer Society, 2005.

[5] M. A. Hearst, S. T. Dumais, E. Osuna, J. Platt, and B. Scholkopf, *Support vector machines*, IEEE Intelligent Systems and their Applications, 13(4):18-28, July 1998.

[6] J. Canny, *A computational approach to edge detection*, IEEE Transactions on Pattern Analysis and Machine Intelligence, PAMI-8(6):679-698, November 1986.

[7] Alex Krizhevsky, Ilya Sutskever, and Geoffrey E Hinton, *Imagenet classification with deep convolutional neural networks*, Advances in neural information processing systems, pages 1097-1105, 2012.

[8] Ross Girshick, Jeff Donahue, Trevor Darrell, and Jitendra Malik, *Rich feature hierarchies for accurate object detection and semantic segmentation*, Proceedings of the IEEE conference on computer vision and pattern recognition, pages 580-587, 2014.

[9] Jasper R R Uijlings, Koen E A Van De Sande, Theo Gevers, and Arnold W M Smeulders, *Selective search for object recognition*, International journal of computer vision, 104(2):154-171, 2013.

[10] Joseph Redmon, Santosh Divvala, Ross Girshick, and Ali Farhadi, *You only look once: Unified, real-time object detection*, Proceedings of the IEEE conference on computer vision and pattern recognition, pages 779-788, 2016.

[11] Ross Girshick, *Fast r-cnn*, Proceedings of the IEEE international conference on computer vision, pages 1440-1448, 2015.

[12] Kaiming He, Xiangyu Zhang, Shaoqing Ren, and Jian Sun, *Deep residual learning for image recognition*, Proceedings of the IEEE conference on computer vision and pattern recognition, pages 770-778, 2016.

[13] Christian Szegedy, Wei Liu, Yangqing Jia, Pierre Sermanet, Scott Reed, Dragomir Anguelov, Dumitru Erhan, Vincent Vanhoucke, and Andrew Rabinovich, *Going deeper with convolutions*, Proceedings of the IEEE conference on computer vision and pattern recognition, pages 1-9, 2015.

[14] Tsung-Yi Lin, Michael Maire, Serge Belongie, James Hays, Pietro Perona, Deva Ramanan, Piotr Dollár, and C Lawrence Zitnick, *Microsoft coco: Common objects in context*, European conference on computer vision, pages 740-755. Springer, 2014.

[15] Andrew G Howard, Menglong Zhu, Bo Chen, Dmitry Kalenichenko, Weijun Wang, Tobias Weyand, Marco Andreetto, and Hartwig Adam, *Mobilenets: Efficient convolutional neural networks for mobile vision applications*, arXiv preprint arXiv:1704.04861, 2017.

[16] Tsung-Yi Lin, Priya Goyal, Ross Girshick, Kaiming He, and Piotr Dollár, *Focal loss for dense object detection*, Proceedings of the IEEE international conference on computer vision, pages 2980-2988, 2017.

In developing the disclosed embodiments, experiments were performed with various state-of-the-art object detection models including Single Shot object detectors like SSD [1] and Region based detectors like Faster R-CNN [2] and R-FCN [3]. A comparative analysis of the results of the foregoing models was performed, taking into consideration mean Average Precision (mAP), loss and accuracy. While there have been many advances in the domain of object detection, region-based detectors have the advantage of a separate region proposal network and a classification network. This allows manipulation of these networks according to needs. Disclosed herein is an implementation of two region-based detectors namely faster region based Convolutional Neural Network (faster R-CNN) and Region Based Fully Convolutional Network (R-FCN). A comparison of results generated by both embodiments is also provided.

Detection of on-screen controls was performed using HOG [4] and SVM [5] but those approaches were only successful with proper region proposals. The reduced runtime of inferencing using this approach comes at the cost of accuracy. Since the region proposal algorithm is based on finding edges and then joining all the adjacent points having the same color or intensity, it is heavily dependent on the edge detection algorithm [6]. In many cases this algorithm fails to propose proper Regions Of Interest (ROI). There have been many approaches to solve the object detection problem using a variety of architectures, as Deep Neural Networks (DNNs) have shown to outperform traditional feature-based extraction methods.

The performance in object detection has significantly improved with the introduction of Convolutional Neural Networks (CNN). These CNN models have drastically improved the accuracy on image classification tasks as well. Since the introduction of AlexNet [7], many different CNN models have been developed to solve the problem of image classification and object detection. Current state-of-the-art object detectors are divided into 2 types: One stage detectors (Single Shot Detectors) and two stage detectors. The most common detectors are two stage detectors where the first stage is responsible for generating Regions of Interests (ROIs) and the second stage is responsible for the classification and regression task. This architecture was first proposed by Regions with CNN features (R-CNN) [8] which used Selective Search [9] for proposing regions and then classifying these regions using CNN. As a lot of time was consumed in proposing regions using the Selective Search algorithm, this stage was replaced with a Region Proposal Network (RPN) so that it can learn the features of the regions which are to be detected. Faster R-CNN [2] thus performed better and faster than its predecessors as the convolutional layers are shared and the weights of the networks are updated in an alternating fashion.

One stage detectors have been built to detect objects in real-time. Single Shot Detectors (SSD) [1] were introduced to create a scale invariant detector which can use multiple layers of multiple scales to perform classification. Redmon et al. [10] introduced a straightforward method to learn the bounding box coordinates of the object and the class score of the object in a region in one pass over an image.

In developing the disclosed embodiments, three datasets for three different models were prepared. The models are distinguished based on the features of the controls such as height, width, aspect ratios and scales. The first model, seen in FIG. 1 at 106 consists of the controls that share the feature of width being greater than the height. This includes textboxes, dropdown, pagetabs, buttons and horizontal scrollbars. The second model seen at 107 comprises of checkboxes, radio buttons and image-buttons, sharing the feature of maintaining aspect ratio of 1 (height=width) and the third model 108 consists of table, tree and vertical scrollbars, all of which have the height generally greater than the width. For each model, a training set, validation set and test set were prepared (109, 110, 111). The validation set is preferably prepared by randomly taking some of the images from the dataset, which are then omitted from the training portion. A large number of images were collected for these controls taking into consideration different resolutions, sizes and styles of each control. A considerable number of images were collected from legacy applications like SAP, Powerbuilder and Oracle E-Business Suite, in addition to web forms.

Examples of the various controls classified as 106, 107 or 108 may be seen in the screenshots shown in FIGS. 2A, 2B, 2C and 2D. Reference number 202 shows examples of buttons, reference number 203 shows examples of dropdown boxes, reference number 204 shows examples of textboxes, reference number 205 shows examples of pagetab and reference number 206 shows examples of scrollbars.

The images were then annotated using LabelImg, a graphical image annotation tool and label object bounding boxes in images. Further information regarding LabelImg may be found at Github.com, for example at: https://github-.com/tzutalin/labelImg. The annotations were preferably performed in a manner such that features of every control such as border and color are retained. After consideration of all these scenarios, a total of 6764 controls were annotated. The class-wise bifurcation of these annotations is summarized in Table 1 below.

TABLE 1

Number of annotations for each class

| Class | Annotations |
|---|---|
| Button | 1655 |
| Dropdown | 1043 |
| Pagetab | 169 |
| Scrollbars | 436 |

LabelImg stores these annotations in XML files in Pascal-VOC Format. These files store important information about the bounding boxes such as xmin, ymin, xmax, ymax, width, height and class-name. These XML files are then converted to CSV files to carry out the data analysis of all these controls as discussed below and to generate a TensorFlow Record, which is then fed to the network. In addition to the training and validation set, a set of unseen images has been chosen for the test set. The test set is also preferably distributed in such a way that all the features and variations of controls are included. This ensures that the results are a generalized representation and are not biased.

Turning to FIG. 1, an application control detection system 10 employs the three models 106, 107 and 108. Separate training, validation and data sets are generated (109, 110, 111) are generated for each model 106, 107, 108, respectively, as described above. In the embodiment of FIG. 1, two convolutional networks (R-FCN 112 and Faster R-CNN 113) are applied to the data sets 109, 110, 111.

Region based detectors have a separate Region Proposal Network (RPN), that proposes the probable regions that may contain the object and their objectness score, and an object detection network that is responsible for regression of bounding boxes and classification. Since region-based networks have a separate region proposal and classification network, extra time has to be devoted for proposing regions. Hence, its main bottleneck is the time required in region proposals.

Figure 3:
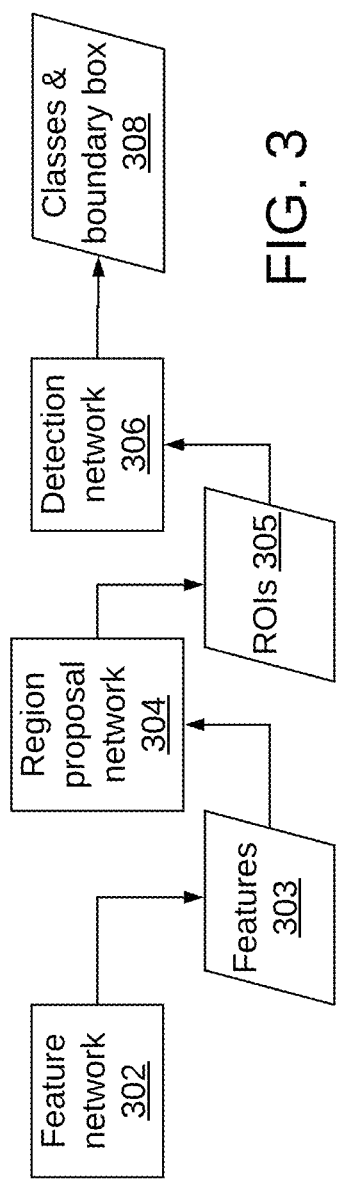
FIGS. 3 and 4 are block diagrams illustrating operation of preferred machine learning models.

R-CNN and Fast R-CNN [11] use selective search to propose regions, which is slow with 2 seconds per proposal on CPU. Hence, the system 10 employs an implementation of Faster R-CNN, an improvement over R-CNN and Fast R-CNN. In contrast to these, faster R-CNN shares the same convolutional layer for region proposal and detection phases. Hence the major computational time required for region proposal in the previous two models is eliminated in faster R-CNN, giving near real time results. Moreover, since selective search is purely based on computer vision and shows no progressive learning with time, it is likely that faster R-CNN which learns to propose regions, given training examples will show better accuracy than its predecessors. Faster R-CNN also shows a unique training pattern. Faster R-CNN employs a Region Proposal Network (RPN) and a detection network that are first trained independently with an Imagenet pretrained model. The training then follows an alternating pattern, where the shared convolutions are fixed and the RPN and detection networks finetune their weights in an alternate fashion. The architecture of faster R-CNN is as shown in FIG. 3. This architecture is divided into three parts: 1) Feature network 302, 2) Region proposal network 304, and 3) Detection network 306. The Feature network 302 is responsible for generating features 303 from the input image. This usually consists of a pretrained classification network. In a preferred implementation, the feature extractor is a pretrained ResNet Network [12]. The reason for using residual networks is to prevent training loss from saturating. The region proposal network 304 employs a base network described in InceptionNet [13] that is pretrained on the MS COCO dataset [14]. This is the network responsible for generating areas of the image that have a high probability of containing object, called "Region of Interests" (ROI) 305. The reason why InceptionNet is used for region proposals is that it allows capture of objects of varying sizes due to its wider network. Hence the size of the control will not affect the region proposals. This network consists of one common layer which serves as input to two other layers, for classification and regression. The image first passes through the first stage of the network, during which the possible ROIs 305 will be generated. The region proposal step is separated from the classification step, which means the loss in generating the ROIs will be backpropagated through the region proposal network 304 only. The region proposal network (RPN) 304 will generate the compressed feature maps as output, which are then passed as input to the second stage. The detection network 306 takes input from both feature network 302 and RPN 304 and is responsible for final classification of identified objects and bounding box regression of the identified objects.

Model Hyper-Parameters. In the Faster R-CNN based implementation, the images have been rescaled to 600× 1024. In one embodiment, the momentum used is 0.9. In this implementation, the initial learning rate is set to 0.0003. The learning rate is reduced to 0.00003 after 900000 steps, which is further reduced to 0.000003 after 1200000 steps. Also, an analysis of the control dimensions was carried out to select appropriate scale and aspect ratios for each model. The mean, median, minimum and maximum height and width for every control was programmatically calculated. A heuristic analysis was again performed on these values, finally resulting in appropriate scales and aspect ratios for each of the three models. Using properly selected values compared to the default values improved the learning rate and accuracy significantly, hence enhancing performance.

Figure 4:
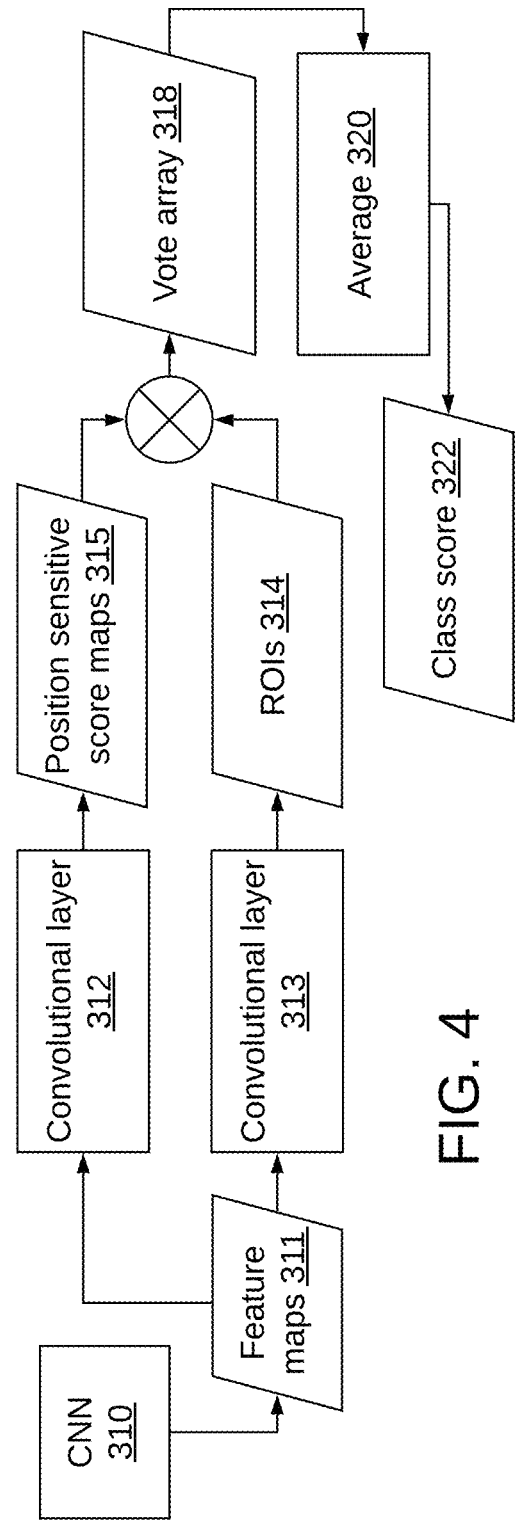

The system 10 also employs a Region Based Fully Convolutional Network (R-FCN) 112 to improve the performance of the pipeline. As R-FCN is a fully convolutional network, it takes less time for inference as compared to Faster R-CNN. Also, R-FCN uses region-based feature maps. These feature maps are independent of ROIs and hence they can be computed outside each ROI. R-FCN calculates the score map of each ROI with the ground truth to determine the objectness and class score. As R-FCN does not have a fully connected (FC) layer after the ROI pooling operation, it performs much faster than Faster R-CNN. By using R-FCN the inference time on a CPU was decreased by 2× as compared to the Faster R-CNN implementation. R-FCN also performed better in terms of accuracy than Faster R-CNN as showed in the graphs. The architecture of R-FCN is shown in FIG. 4. As shown in FIG. 4, the image first passes through a pretrained CNN 310 to generate feature maps 311. These feature maps 311 then pass through two convolutional layers 312 and 313 to generate ROIs 314 and position sensitive score maps 315. Position sensitive score maps 315 are the sub region specific feature maps of the object. The combined results of generated ROIs 314 and position sensitive score maps 315, are mapped into a vote array 318. This mapping is termed as position sensitive ROI pooling. The values of this vote array are averaged at 320 to generate a class score 322. The method employed for bounding box regression is almost the same. Other 4×k×k convolutional filters are generated from the same feature maps (the object is assumed to be divided into k×k subregions). Single shot detectors like SSD were tried but did have not depicted satisfactory performance for the said use case. A comparative analysis of all the approaches is presented in further herein.

Model Hyper-Parameters. All of the hyperparameters of R-FCN based implementation are the same as that of Faster R-CNN based implementation except the method of determining appropriate scales and aspect ratios and introduction of data augmentation, which are discussed in detail below.

Scales and Aspect Ratios. A K-means clustering algorithm is employed to determine proper values of scales and aspect ratios with K=3 since 3 scales and aspect ratios have been used in a default implementation of R-FCN. Using properly selected values compared to the default values improved the learning rate and accuracy significantly, hence enhancing performance.

Data Augmentation. To solve data imbalance among classes, various data augmentation methods were applied, namely random crop, random adjust brightness, random adjust contrast and RGB to grayscale. These augmentation methods solved data imbalance to a certain extent, increasing performance.

Results of the engines 112 and 113 are employed by bot generation engine 116 to generate one or more cognitive software robots (bots), seen generally at 102. The cognitive bots 102 may then be employed by a user 120 to process one or more documents 105 to generate mapped controls 122 where controls in a given application level user interface, such as shown in FIGS. 2A, 2B, 2C, and 2D are identified to enable automated usage by a software robot.

Figure 5C:
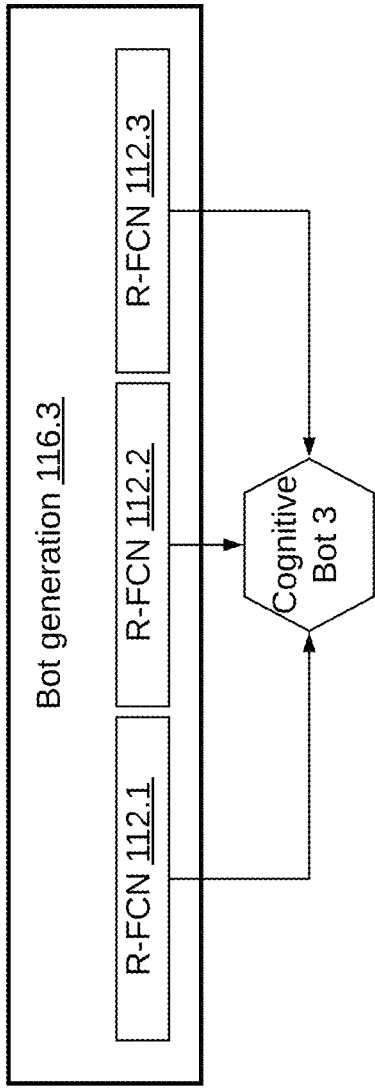
Figure 5D:
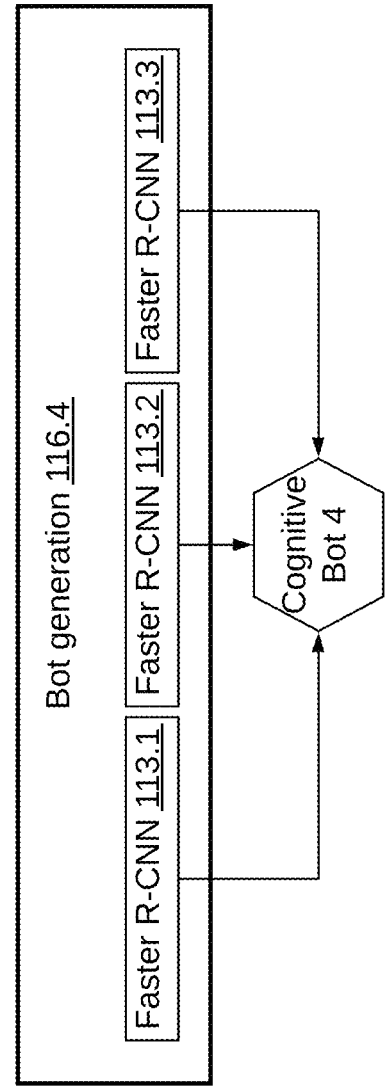

FIGS. 5A, 5B, 5C and 5D are block diagrams illustrating operation of four alternative embodiments of bot generation module 116 employed by the system of FIG. 1. In the embodiment of FIG. 5A, a bot 102 is configured to employ each R-FCN engine 112 to process an image 105. This permits recognition of the various controls for which each of the R-FCN engines (112.1, 112.2, 112.3) is optimized. The order of processing by the engines 112 shown in FIG. 5A is not critical and may be changed. Moreover, the processing need not be sequential but instead may be performed concurrently as seen in FIG. 5C. In the embodiment of FIG. 5B, a bot 102 is configured to employ each Faster R-CNN engine 113 to process an image 105. This permits recognition of the various controls for which each of the Faster R-CNN engines (113.1, 113.2, 113.3) is optimized. The order of processing by the engines 113 shown in FIG. 5B is not critical and may be changed. Moreover, the processing need not be sequential but instead may be performed concurrently as seen in FIG. 5D.

The bots 102 may be employed in a Robotic Process Automation (RPA) system such as available from Automation Anywhere, Inc. Such an RPA system implements a bot creator that may be used by a RPA user, to create one or more bots that are used to automate various business processes executed by one or more computer applications, such as the applications that generate the user interfaces seen in FIGS. 2A, 2B, 2C and 2D. The term "bot" as used herein refers to a set of instructions that cause a computing resource to interact with one or more user level computer applications to perform tasks provided by the one or more user level computer applications. Once created, the bot may be employed to perform the tasks as encoded by the instructions to interact with one or more user level computer applications.

In certain environments, the information provided by an application may contain sensitive information, the distribution or viewing of which may be subject to various regulatory or other restrictions. In such an environment, as described in U.S. patent application "DETECTION AND DEFINITION OF VIRTUAL OBJECTS IN REMOTE SCREENS", Ser. No. 15/957,030, filed on Apr. 19, 2018, which application is hereby incorporated by reference in its entirety, an automation controller, resident on a computer system operates in conjunction with an RPA system to interact with another, remote, computer system. The RPA system sends automation commands and queries to the automation controller, while respecting the security compliance protocols of the remote computer system. As described, a compliance boundary may be implemented in connection with a remote access module. The compliance boundary represents a logical boundary, across which, any transfer of data or other information is controlled by agreements between parties. In certain embodiments, the remote access module may operate to prevent the RPA user from performing certain tasks on the remote system, by way of example and not limitation, copying files, loading cookies, or transmitting data from the remote computer system, through or beyond the compliance boundary via the internet or via any other output device that would violate the security protocols established by the remote computer system. The remote access module may take the form of remote desktop products available from Citrix or Microsoft, which permit connection to a remote computer, to establish a communication link between the user's system and the remote system to permit apps, files, and network resources to be made available. The system 10 described herein may be employed in the above described environment to permit recognition of the application controls provided by the application accessed across the aforementioned compliance boundary.

Figure 8:
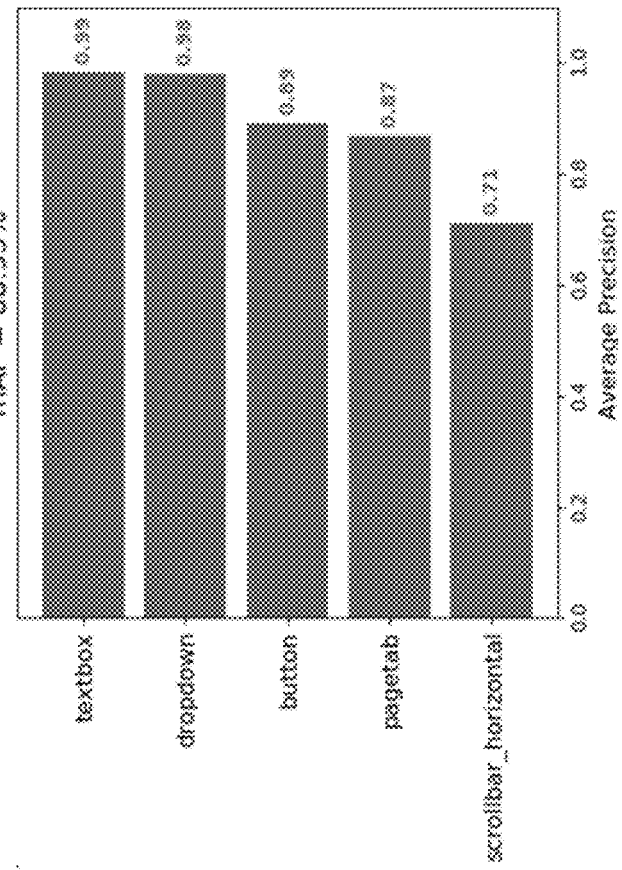
FIG. 8 is a graph showing log-average miss rate for various controls using Faster R-CNN.

RESULTS. The results suggest that as the number of instances of the object increase in the dataset, the model performs pretty well for that class. This is evident from FIG. 8 wherein we can see that as the number of instances of horizontal scrollbar is the lowest its average miss rate is the highest at 0.44. Whereas the textbox class has the highest number of annotations and thus its average miss rate is the lowest at 0.05. This can be solved if we increase the dataset to incorporate more instances of minority class.

The models were evaluated against a validation set consisting of 28 images and carried out a comparative analysis of their mean average precision (mAP) for model-1 (textboxes, buttons, dropdowns, pagetabs and horizontal scrollbars). The set consisted of images of various applications previously unseen by the model.

Figure 6:
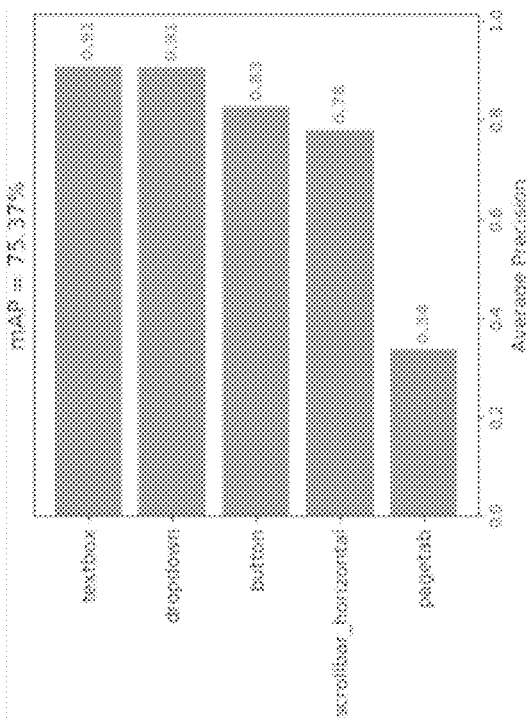
FIG. 6 is a graph comparing performance of two preferred machine learning models (Faster R-CNN and R-CNN).
Figure 7:
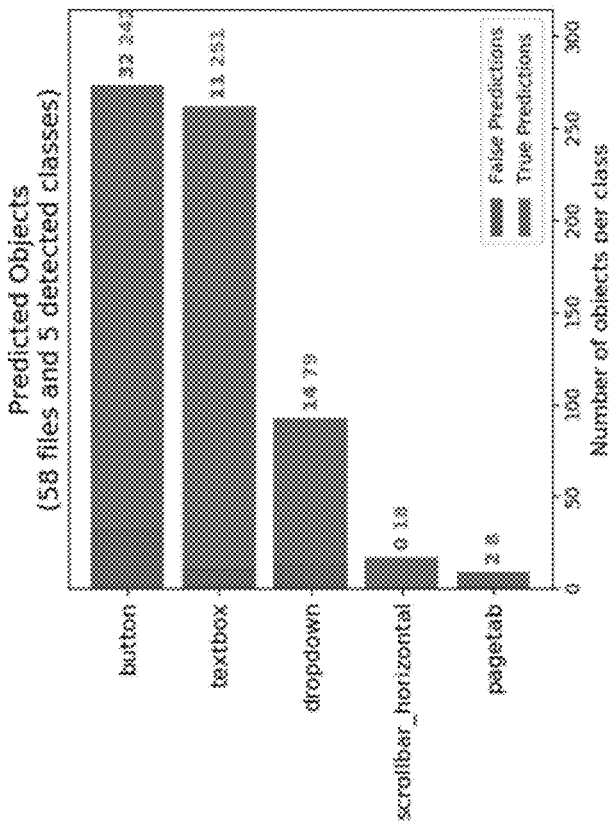
FIG. 7 is a graph showing class-wise performance using Faster R-CNN.

Faster R-CNN Results. The Faster R-CNN implementation achieved a mAP of 75.37. The Intersection Over Union (IOU), mAP, classwise predictions and log average miss rate (lamr) are shown in Table 2 below, and FIGS. 6, 7, and 8 respectively.

TABLE 2

Intersection over Union (IoU) for each class using Faster R-CNN

| Class | IoU |
|---|---|
| Button | 0.8426 |
| Dropdown | 0.8274 |
| Pagetab | 0.8095 |
| Scrollbar_horizontal | 0.8556 |
| Textbox | 0.8334 |
| Mean IoU | 0.8368 |

The Precision-Recall (P-R) curve for each of the five classes of model-1 using faster R-CNN are shown in FIGS. 12A, 12B, 12C, 12D, and 12E which are graphs showing P-R curves for various controls using Faster R-CNN, and in FIGS. 13A, 13B, 13C, 13D, and 13E which are graphs showing P-R curves for various controls using R-FCN.

Figure 9:
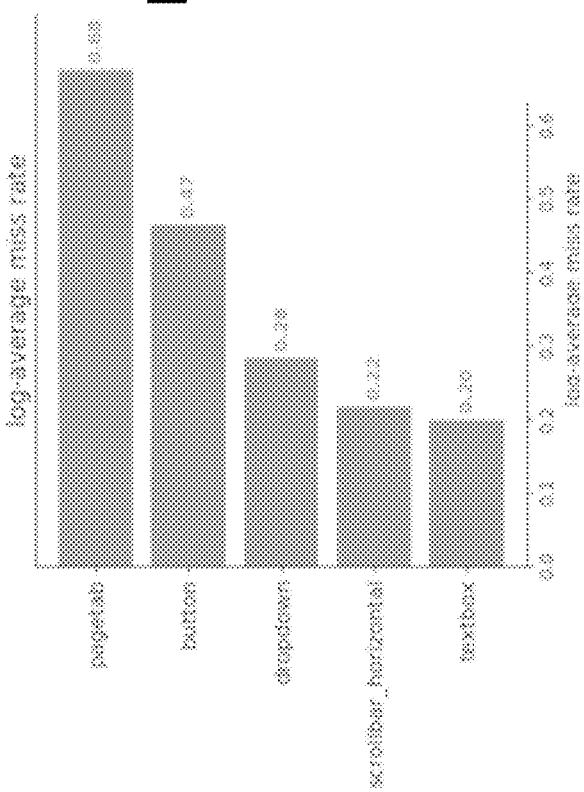
FIG. 9 is a graph showing class-wise mean average precision (mAP) using R-FCN.
Figure 10:
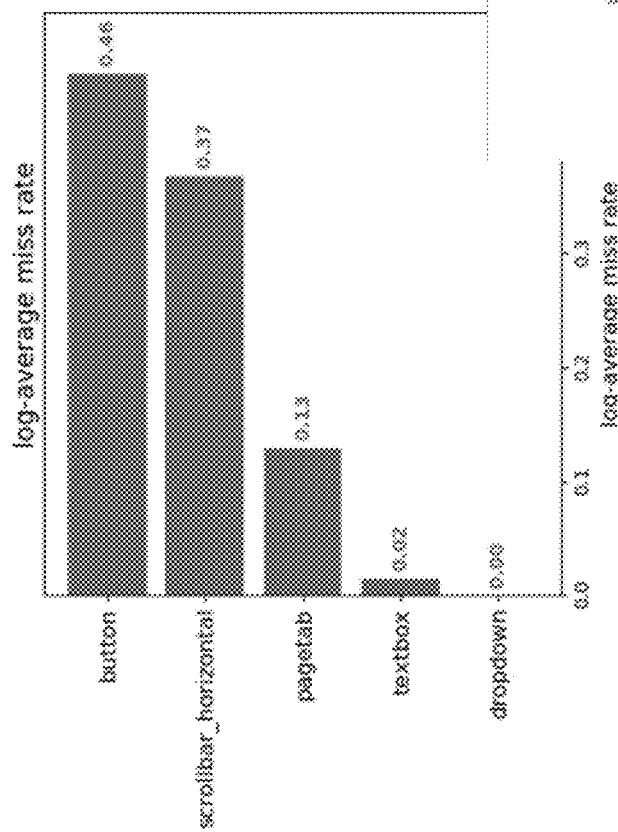
FIG. 10 is a graph showing log average missrate using R-FCN.
Figure 11:
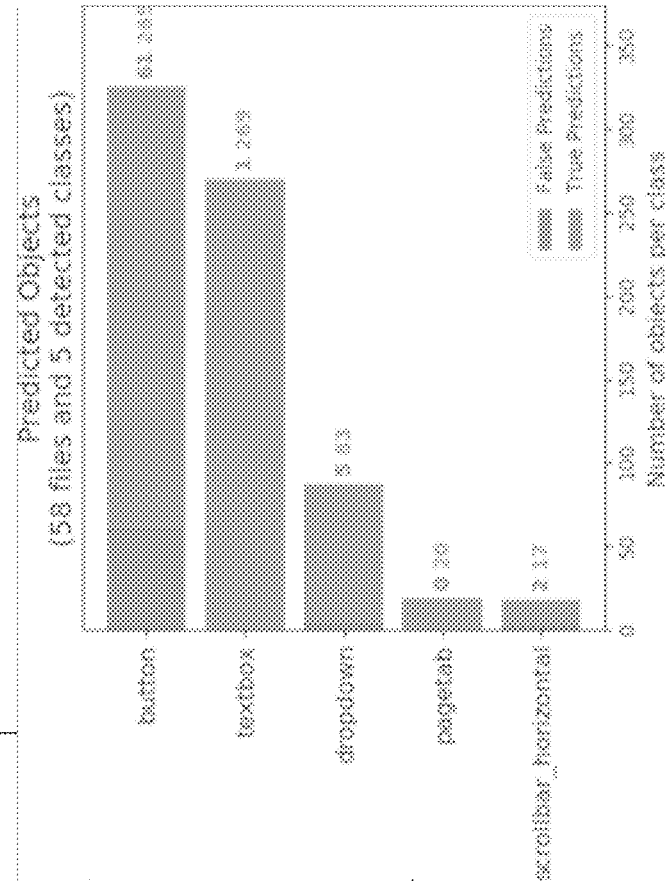
FIG. 11 is a graph showing predicted object information.
Figure 12B:
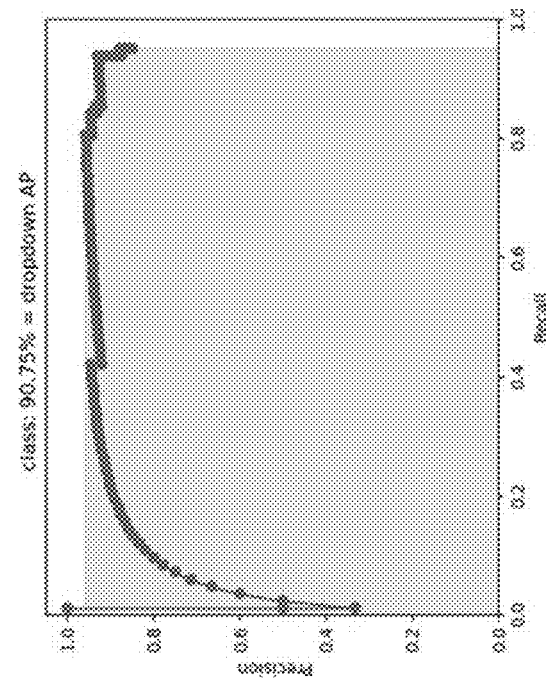
FIGS. 12A, 12B, 12C, 12D, and 12E are graphs showing P-R curves for various controls using Faster R-CNN.
Figure 12A:
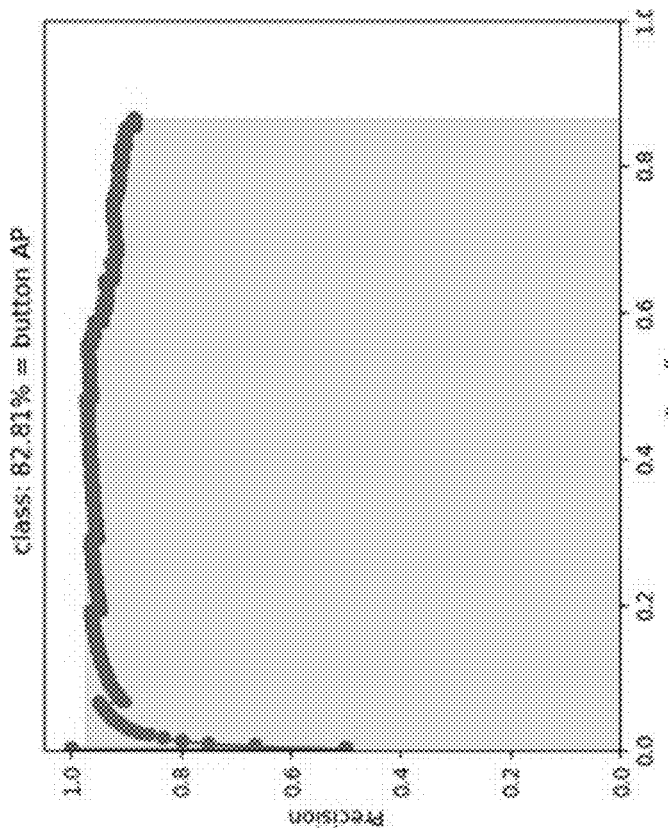
Figure 12D:
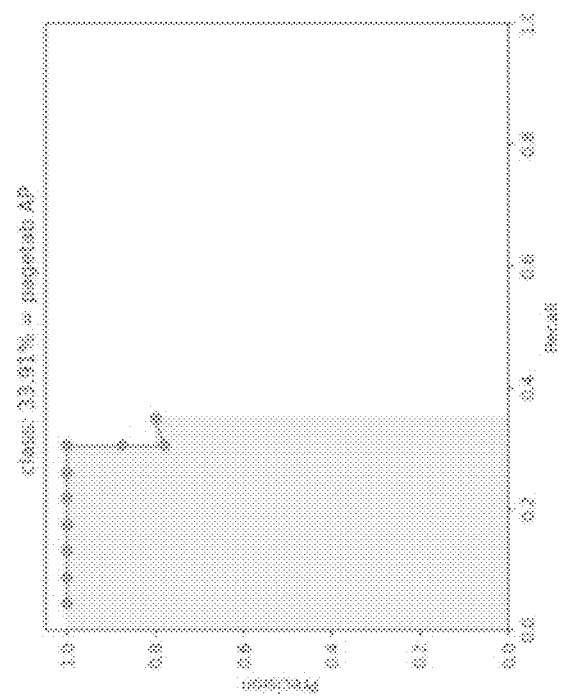
Figure 12C:
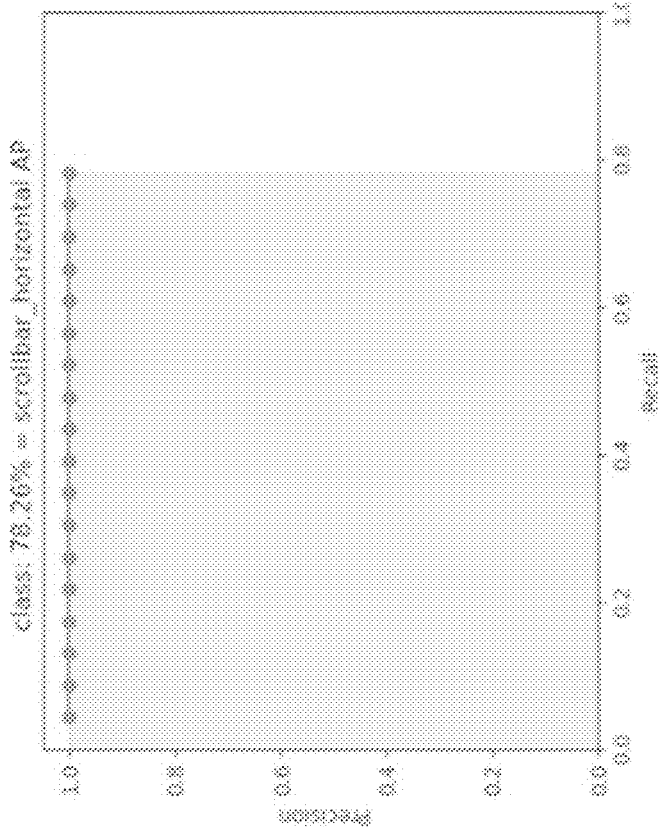
Figure 12E:
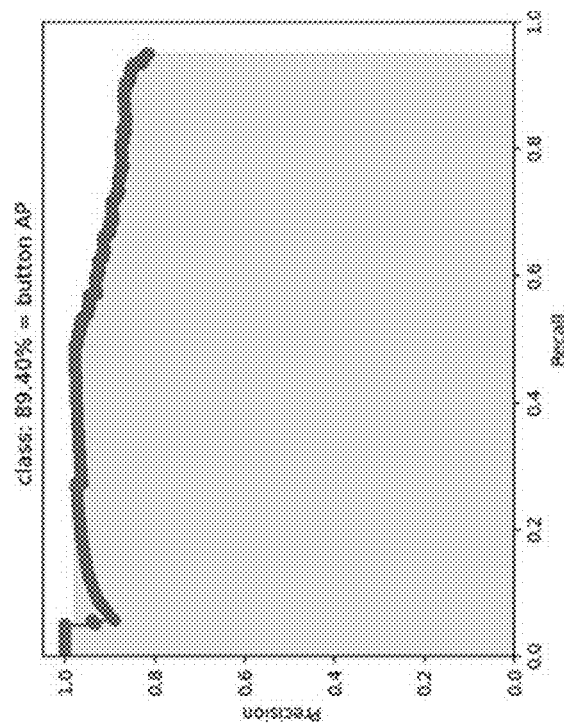
Figure 13A:
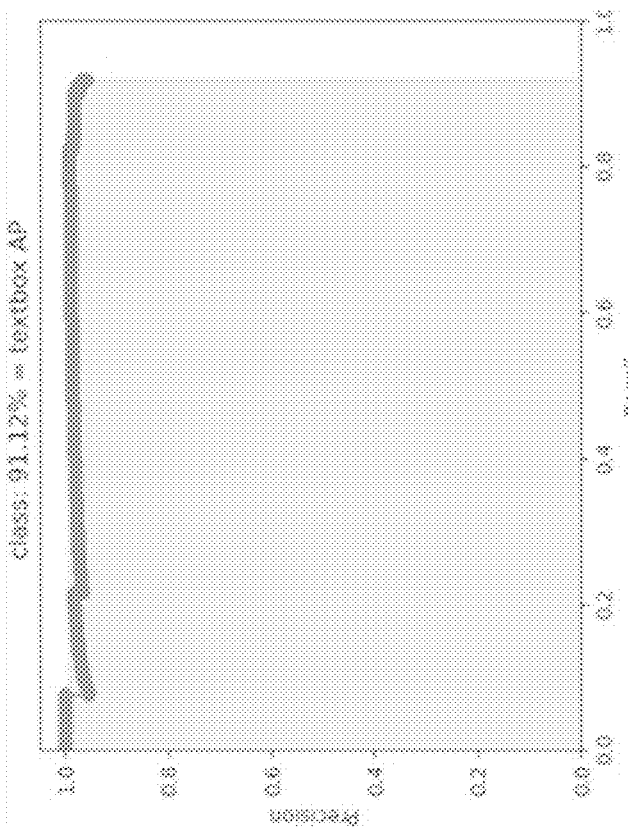
FIGS. 13A, 13B, 13C, 13D, and 13E are graphs showing P-R curves for various controls using R-FCN.
Figure 13B:
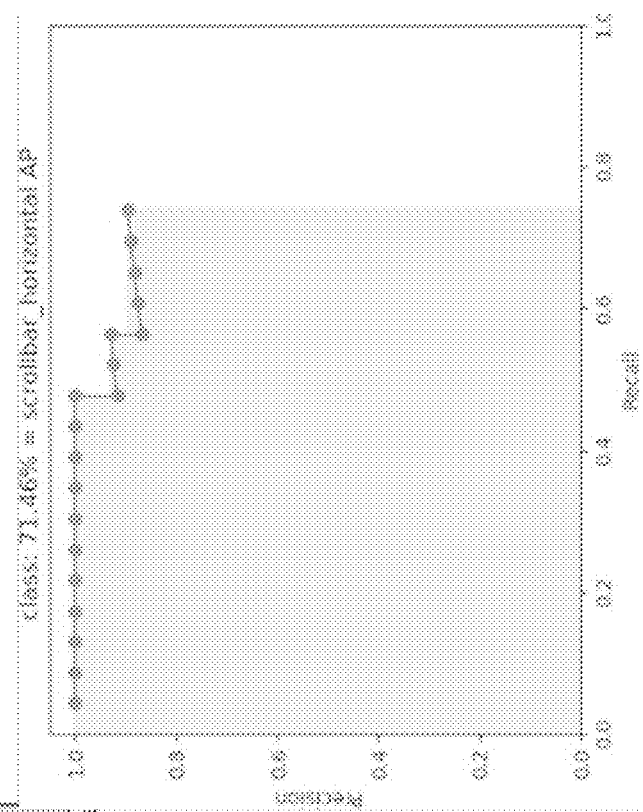
Figure 13C:
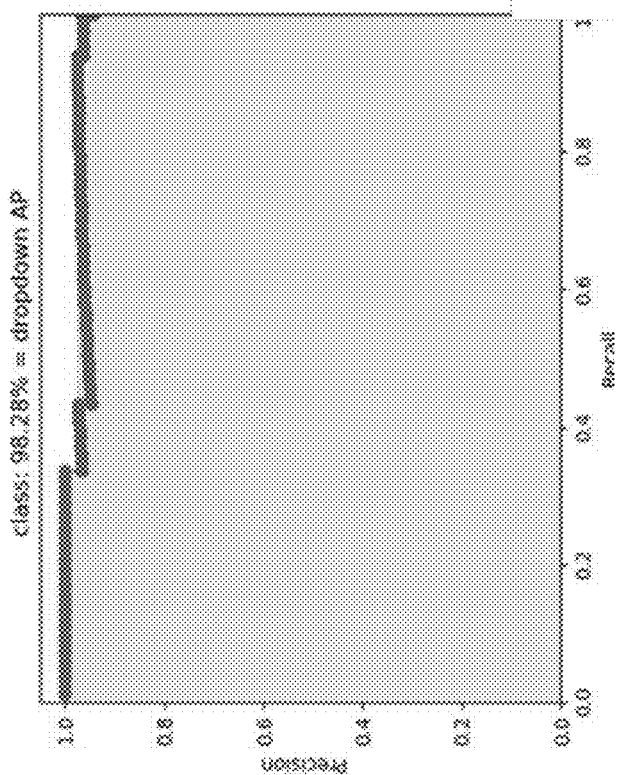
Figure 13D:
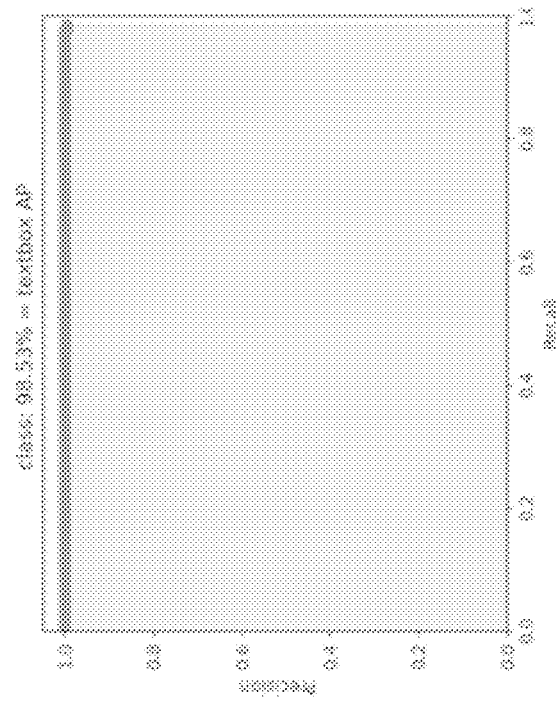
Figure 13E:
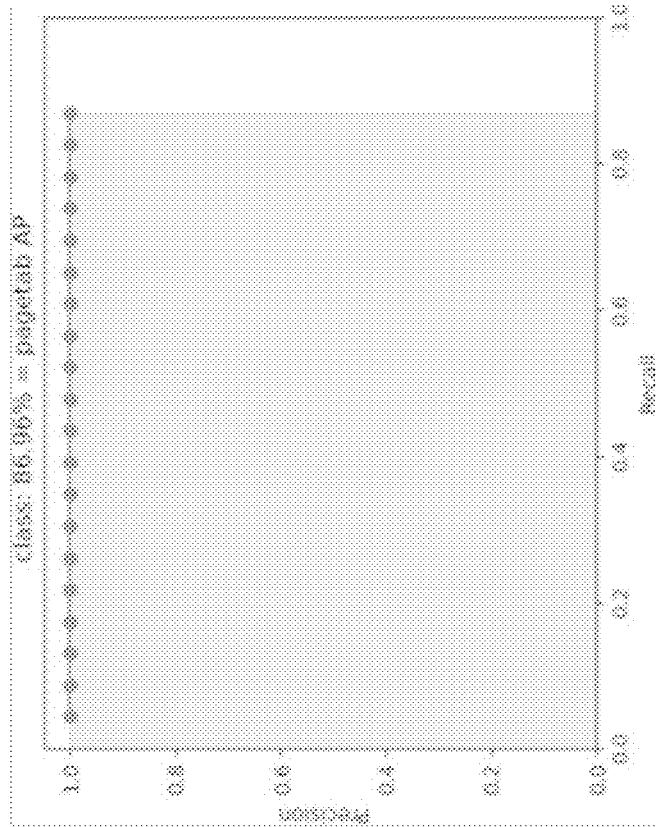

R-FCN Results. The R-FCN implementation achieved mAP of 88.93 using the R-. The Intersection Over Union (IOU), mAP, log average miss rate (lamr), and classwise predictions using R-FCN are shown in Table 3 below, FIG. 9, FIG. 10 and FIG. 11, respectively.

TABLE 3

Intersection over Union (IoU) for each class using Faster R-FCN

| Class | IoU |
|---|---|
| Button | 0.8941 |
| Dropdown | 0.8821 |
| Pagetab | 0.8213 |
| Scrollbar_horizontal | 0.8384 |
| Textbox | 0.8814 |
| Mean IoU | 0.8834 |

The Precision-Recall (P-R) curve for each of the five classes of model-1 using R-FCN are shown in FIGS. 13A, 13B, 13C, 13D and 13E.

The current network is significantly heavy and takes about 1-2 days for training on our dataset. In an alternative embodiment, a shallow network that retains the present accuracy and is computationally inexpensive compared to R-FCN may be employed. Also, training on different models such as SSD ResNet, MobileNet [15] or RetinaNet [16] can be employed. Additional embodiments may be specifically focused on additional controls like sliders, image buttons, tables, and toggle buttons. Moreover, since the dataset is a critical factor influencing the performance, the addition of more data will lead to enhanced performance.

Figure 14:
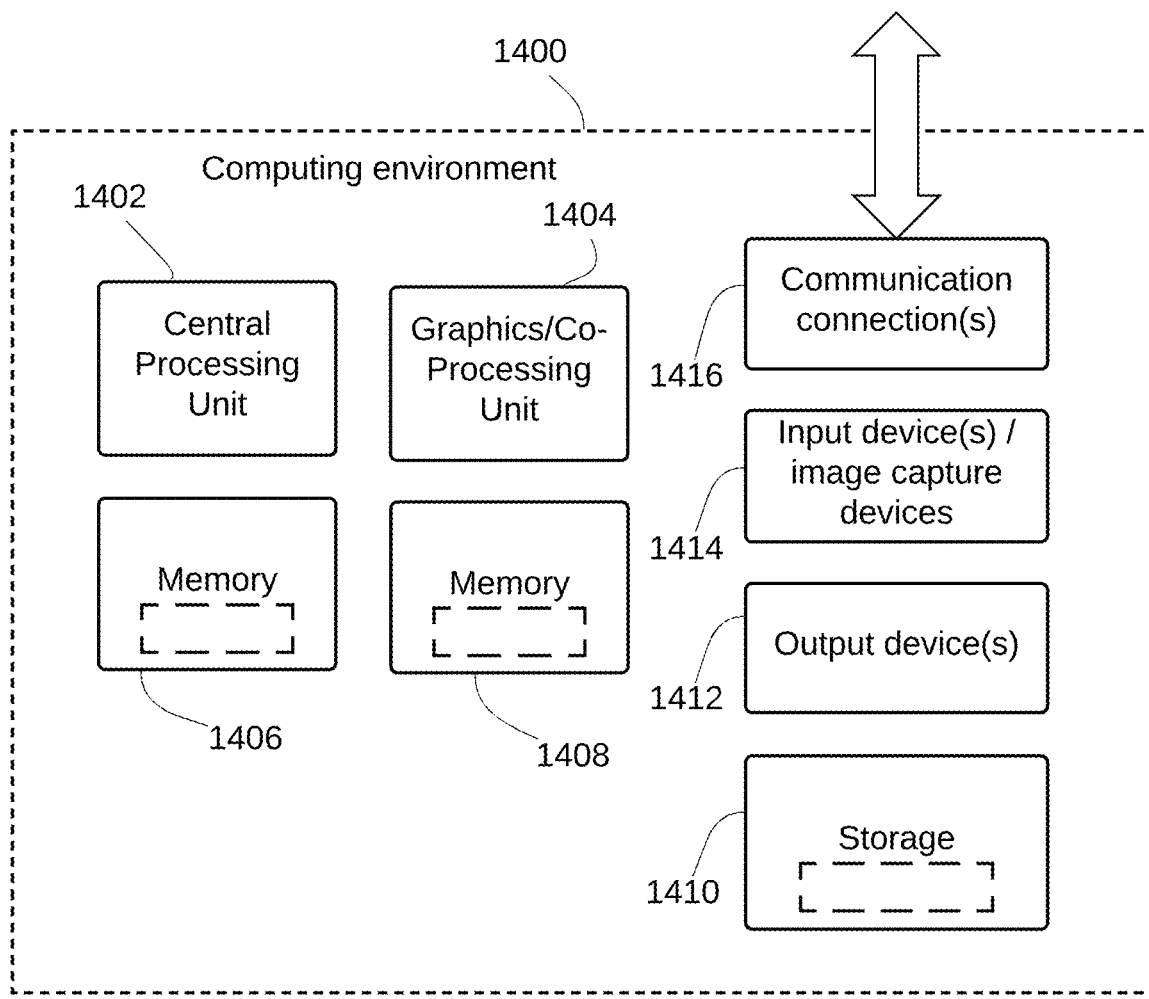
FIG. 14 illustrates a block diagram of hardware that may be employed in an implementation of the systems disclosed herein.

FIG. 14 illustrates a block diagram of hardware that may be employed in an implementation of the RPA system as disclosed herein. FIG. 14 depicts a generalized example of a suitable general-purpose computing system 1400 in which the described innovations may be implemented in order to improve the processing speed and efficiency with which the computing system 1400 operates to perform the functions disclosed herein. With reference to FIG. 14 the computing system 1400 includes one or more processing units 1402, 1404 and memory 1406, 1408. The processing units 1402, 1406 execute computer-executable instructions. A processing unit can be a general-purpose central processing unit (CPU), processor in an application-specific integrated circuit (ASIC) or any other type of processor. The tangible memory 1406, 1408 may be volatile memory (e.g., registers, cache, RAM), non-volatile memory (e.g., ROM, EEPROM, flash memory, etc.), or some combination of the two, accessible by the processing unit(s). The hardware components in FIG. 14 may be standard hardware components, or alternatively, some embodiments may employ specialized hardware components to further increase the operating efficiency and speed with which the system 100 operates. The various components of computing system 1400 may be rearranged in various embodiments, and some embodiments may not require nor include all of the above components, while other embodiments may include additional components, such as specialized processors and additional memory.

Computing system 1400 may have additional features such as for example, storage 1410, one or more input devices 1414, one or more output devices 1412, and one or more communication connections 1416. An interconnection mechanism (not shown) such as a bus, controller, or network interconnects the components of the computing system 1400. Typically, operating system software (not shown) provides an operating system for other software executing in the computing system 1400, and coordinates activities of the components of the computing system 1400.

The tangible storage 1410 may be removable or non-removable, and includes magnetic disks, magnetic tapes or cassettes, CD-ROMs, DVDs, or any other medium which can be used to store information in a non-transitory way, and which can be accessed within the computing system 1400. The storage 1410 stores instructions for the software implementing one or more innovations described herein.

The input device(s) 1414 may be a touch input device such as a keyboard, mouse, pen, or trackball, a voice input device, a scanning device, or another device that provides input to the computing system 1400. For video encoding, the input device(s) 1414 may be a camera, video card, TV tuner card, or similar device that accepts video input in analog or digital form, or a CD-ROM or CD-RW that reads video samples into the computing system 1400. The output device(s) 1412 may be a display, printer, speaker, CD-writer, or another device that provides output from the computing system 1400.

The communication connection(s) 1416 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A computerized method for automated detection of application level controls displayed by a computer application, comprising:
    retrieving a first dataset comprising images containing a first type of application control, wherein each first type of application control of a plurality of first type of application controls in each image in the first dataset is characterized by dimensions where width of the first type of application control is greater than height of the first type of application control;
    retrieving a second dataset comprising images containing a second type of application control, wherein each second type of application control of a plurality of second type of application controls in each image in the second dataset is characterized by dimensions where width of the second type of application control is substantially equal to height of the second type of application control;
    retrieving a third dataset comprising images containing a third type of application control, wherein each third type of application control of a plurality of third type of application controls in each image in the third dataset is characterized by dimensions where height of the third type of application control is greater than width of the third type of application control;
    processing each of the first, second and third datasets with a region-based R-FCN engine to generate:
        a first trained region-based R-FCN engine that is trained to recognize application controls characterized by dimensions where width is greater than height,
        a second trained region-based R-FCN engine that is trained to recognize application controls characterized by dimensions where width is substantially equal to height, and
        a third trained region-based R-FCN engine that is trained to recognize application controls characterized by dimensions where height is greater than width; and
    combining the first, second and third trained region-based R-FCN engines to generate a software robot configured to recognize, from an input image generated from a screen of an application program, application controls wherein the application controls are characterized by dimensions where width is greater than height, where width is substantially equal to height, or where height is greater than width.

2. The computerized method of claim 1 wherein combining the first, second and third trained region-based R-FCN engines to generate a software robot comprises:
    combining the first, second and third trained region-based R-FCN engines to cause sequential processing by the first, second and third trained region-based R-FCN engines.

3. The computerized method of claim 1 wherein combining the first, second and third trained region-based R-FCN engines to generate a software robot comprises:
    combining the first, second and third trained region-based R-FCN engines to cause concurrent processing by the first, second and third trained region-based R-FCN engines.

4. The computerized method of claim 1 wherein each of the first, second and third trained region-based R-FCN engines comprises:
    a pretrained convolutional neural network that generates from an input image:
        a plurality of feature maps, and
        a second and a third convolutional neural network that each receive the plurality of feature maps, wherein the second convolutional neural network generates regions of interest from the feature maps and wherein the third convolutional neural network generates a plurality of position sensitive score maps;
    combining the regions of interest and the position sensitive score maps to generate a vote array that comprises a position sensitive regions of interest pooling; and
    averaging values of the vote array to generate a class score.

5. A computerized method for automated detection of application level controls displayed by a computer application, comprising:
    retrieving a first dataset comprising images containing a first type of application control, wherein each first type of application control of a plurality of first type of application controls in each image in the first dataset is characterized by dimensions where width of the first type of application control is greater than height of the first type of application control;
    retrieving a second dataset comprising images containing a second type of application control, wherein each second type of application control of a plurality of second type of application controls in each image in the second dataset is characterized by dimensions where width of the second type of application control is substantially equal to height of the second type of application control;

retrieving a third dataset comprising images containing a third type of application control, wherein each third type of application control of a plurality of third type of application controls in each image in the third dataset is characterized by dimensions where height of the third type of application control is greater than width of the third type of application control;

processing each of the first, second and third datasets with a region-based faster R-CNN engine to generate:
  a first trained region-based faster R-CNN engine that is trained to recognize application controls characterized by dimensions where width is greater than height,
  a second trained region-based faster R-CNN engine that is trained to recognize application controls characterized by dimensions where width is substantially equal to height, and
  a third trained region-based faster R-CNN engine that is trained to recognize application controls characterized by dimensions where height is greater than width, and combining the first, second and third trained region-based faster R-CNN engines to generate a software robot configured to recognize, from an input image generated from a screen of an application program, application controls characterized by dimensions where width is greater than height, where width is substantially equal to height, or where height is greater than width.

6. The computerized method of claim 5 wherein combining the first, second and third trained region-based faster R-CNN engines to generate a software robot comprises:
  combining the first, second and third trained region-based faster R-CNN engines to cause sequential processing by the first, second and third trained region-based faster R-CNN engines.

7. The computerized method of claim 5 wherein combining the first, second and third trained region-based faster R-CNN engines to generate a software robot comprises:
  combining the first, second and third trained region-based faster R-CNN engines to cause concurrent processing by the first, second and third trained region-based faster R-CNN engines.

8. The computerized method of claim 5 wherein each of the first, second and third trained region-based faster R-CNN engines comprises:
  a feature network that generates features from the input image,
  a region proposal network that generates from the features, regions of interest, wherein the regions of interest comprise areas of the input image that have a high probability of containing an object, and
  a detection network that generates from the regions of interest, classifications of identified objects and bounding box regressions of the identified objects.

9. A robotic process automation system comprising:
  data storage for storing a plurality of images of application user interfaces, wherein each application user interface of the application user interfaces comprises one or more application controls usable by a human user to interact with an application that generates the application user interface;
  a server processor operatively coupled to the data storage and configured to execute instructions that when executed cause the server processor to recognize one or more of the application controls, by:
    retrieving a first dataset comprising images containing a first type of application control, wherein each first type of application control of a plurality of first type of application controls in each image in the first dataset is characterized by dimensions where width of the first type of application control is greater than height of the first type of application control;
    retrieving a second dataset comprising images containing a second type of application control, wherein each second type of application control of a plurality of second type of application controls in each image in the second dataset is characterized by dimensions where width of the second type of application control is substantially equal to height of the second type of application control;
    retrieving a third dataset comprising images containing a third type of application control, wherein each third type of application control of a plurality of third type of application controls in each image in the third dataset is characterized by dimensions where height of the third type of application control is greater than width of the third type of application control;
    processing each of the first, second and third datasets with a region-based R-FCN engine to generate:
      a first trained region-based R-FCN engine that is trained to recognize application controls characterized by dimensions where width is greater than height,
      a second trained region-based R-FCN engine that is trained to recognize application controls characterized by dimensions where width is substantially equal to height,
      a third trained region-based R-FCN engine that is trained to recognize application controls characterized by dimensions where height is greater than width; and
    combining the first, second and third trained region-based R-FCN engines to generate a first software robot configured to recognize, from an input image, application controls wherein the application controls are characterized by dimensions where width is greater than height, where width is substantially equal to height, or where height is greater than width.

10. The robotic process automation system of claim 9 wherein combining the first, second and third trained region-based R-FCN engines to generate a software robot comprises:
  combining the first, second and third trained region-based R-FCN engines to cause sequential processing by the first, second and third trained region-based R-FCN engines.

11. The robotic process automation system of claim 9 wherein combining the first, second and third trained region-based R-FCN engines to generate a software robot comprises:
  combining the first, second and third trained region-based R-FCN engines to cause concurrent processing by the first, second and third trained region-based R-FCN engines.

12. The robotic process automation system of claim 9 wherein each of the first, second and third region-based R-FCN engines comprises:
  a pretrained convolutional neural network that generates from an input image:
    a plurality of feature maps, and a second and a third convolutional neural network that each receive the plurality of feature maps, wherein the second convolutional neural network generates regions of interest from the feature maps and wherein the third convolutional neural network generates a plurality of position sensitive score maps;

combining the regions of interest and the position sensitive score maps to generate a vote array that comprises a position sensitive regions of interest pooling; and averaging values of the vote array to generate a class score.

13. The robotic process automation system of claim 9 wherein the server processor is further configured to execute instructions that when executed cause the server processor to recognize one or more of the application controls, by:

processing each of the first, second and third datasets with a region-based faster R-CNN engine to generate:

a first trained region-based faster R-CNN engine that is trained to recognize application controls characterized by dimensions where width is greater than height, a second trained region-based faster R-CNN engine that is trained to recognize application controls characterized by dimensions where width is substantially equal to height, and a third trained region-based faster R-CNN engine that is trained to recognize application controls characterized by dimensions where height is greater than width; and combining the first, second and third trained region-based faster R-CNN engines to generate a second software robot configured to recognize, from an input image, application controls characterized by dimensions where width is greater than height, where width is substantially equal to height, or where height is greater than width.

14. The robotic process automation system of claim 13 wherein combining the first, second and third trained region-based faster R-CNN engines to generate a software robot comprises:

combining the first, second and third trained region-based faster R-CNN engines to cause sequential processing by the first, second and third trained region-based faster R-CNN engines.

15. The robotic process automation system of claim 13 wherein combining the first, second and third trained region-based faster R-CNN engines to generate a software robot comprises:

combining the first, second and third trained region-based faster R-CNN engines to cause concurrent processing by the first, second and third trained region-based faster R-CNN engines.

16. The robotic process automation system of claim 13 wherein each of the first, second and third trained region-based faster R-CNN engines comprises:

a feature network that generates features from the input image, a region proposal network that generates from the features, regions of interest, wherein the regions of interest comprise areas of the input image that have a high probability of containing an object, and a detection network that generates from the regions of interest, classifications of identified objects and bounding box regressions of the identified objects.

* * * * *